(12) United States Patent
Dralle

(10) Patent No.: US 7,771,517 B2
(45) Date of Patent: Aug. 10, 2010

(54) FILTERING METHOD

(75) Inventor: James R. Dralle, Lemont, IL (US)

(73) Assignee: Global Finishing Solutions, L.L.C., Osseo, WI (US)

( * ) Notice: Subject to any disclaimer, the term of this patent is extended or adjusted under 35 U.S.C. 154(b) by 424 days.

(21) Appl. No.: 11/803,220

(22) Filed: May 14, 2007

(65) Prior Publication Data

US 2008/0283476 A1    Nov. 20, 2008

(51) Int. Cl.
B01D 46/00    (2006.01)

(52) U.S. Cl. .............. 95/273; 55/497; 55/521; 55/529; 95/284; 210/494.1

(58) Field of Classification Search ........... 55/497, 55/521, 527, 528, 529, DIG. 46; 95/273, 95/284; 210/494.1
See application file for complete search history.

(56) References Cited

U.S. PATENT DOCUMENTS

| | | | |
|---|---|---|---|
| 1,743,675 A | | 1/1930 | Jordahl |
| 2,125,271 A | | 8/1938 | Dahlman |
| 2,862,624 A | * | 12/1958 | Stokes ............ 428/181 |
| 3,261,473 A | | 7/1966 | Riede |
| 3,276,597 A | | 10/1966 | Mesek et al. |
| 3,599,399 A | | 8/1971 | Gallen |
| 3,912,634 A | | 10/1975 | Howell |
| 3,937,663 A | * | 2/1976 | Bessiere ............ 210/493.1 |
| 4,019,987 A | | 4/1977 | Krasnow |
| 4,112,037 A | | 9/1978 | Parker et al. |
| 4,178,161 A | * | 12/1979 | Rudner et al. ............ 55/524 |
| 4,211,661 A | | 7/1980 | Perry |
| 4,227,904 A | | 10/1980 | Kasmark et al. |
| 4,321,064 A | | 3/1982 | Vargo |
| 4,323,374 A | | 4/1982 | Shinagawa et al. |
| 4,326,310 A | | 4/1982 | Frankenberg |
| 4,399,574 A | | 8/1983 | Shuman |
| 4,443,233 A | | 4/1984 | Moran |
| 4,579,658 A | | 4/1986 | Moller |
| 4,603,445 A | | 8/1986 | Spann |
| 4,700,447 A | | 10/1987 | Spann |
| 4,734,195 A | * | 3/1988 | Lhuillier et al. ........ 210/493.1 |
| 4,768,251 A | | 9/1988 | Baskent |
| 4,874,412 A | | 10/1989 | Nowack |
| 4,904,288 A | | 2/1990 | d'Augereau |

(Continued)

*Primary Examiner*—Michael A Marcheschi
*Assistant Examiner*—Robert A Clemente
(74) *Attorney, Agent, or Firm*—Meroni & Meroni, P.C.; Charles F. Meroni, Jr.; Christopher J. Scott

(57) ABSTRACT

A fluid filter is preferably constructed from a relatively thick batting of high loft, non-woven, fluid permeable fibrous material. The filter batting is then passed through a manufacturing device, which slices the batting in the vertical as to create two continuous filter batts from the parent filter batt. The slicing also creates a relatively deep V-shaped zig zag or waveform pattern in the anterior filter surfaces of the top and bottom of the batt. The top half deep V-shaped zigzag patterns peaks and valleys correspond or line up with the bottom half's valleys and peaks since the waveform landscape of the first child batt is essentially a negative impression of the second child batt. Accordingly, the patterns nest within one another. When separated, the two children batts each comprise a waveform landscape for dynamically directing fluid streams from the anterior filter surface to the posterior filter surface.

14 Claims, 23 Drawing Sheets

U.S. PATENT DOCUMENTS

| | | | |
|---|---|---|---|
| 4,917,942 A | 4/1990 | Winters | |
| 4,925,560 A | 5/1990 | Sorrick | |
| 4,942,020 A * | 7/1990 | Whittenberger et al. | 422/180 |
| 4,975,101 A * | 12/1990 | Swanborn | 55/440 |
| 5,034,042 A | 7/1991 | Allen, Jr. | |
| 5,037,455 A | 8/1991 | Scheinseson et al. | |
| 5,051,118 A | 9/1991 | Andreae | |
| 5,064,453 A | 11/1991 | Jacquish | |
| D326,204 S | 5/1992 | Main | |
| 5,114,448 A | 5/1992 | Bartilson | |
| 5,137,634 A | 8/1992 | Butler et al. | |
| 5,188,646 A | 2/1993 | Nolen, Jr. | |
| D339,019 S | 9/1993 | Main | |
| 5,269,823 A * | 12/1993 | Wurz | 55/440 |
| 5,327,597 A | 7/1994 | Rothbard | |
| 5,338,340 A | 8/1994 | Kasmark, Jr. et al. | |
| D352,634 S | 11/1994 | Canning | |
| 5,419,953 A | 5/1995 | Chapman | |
| 5,430,901 A | 7/1995 | Farley | |
| 5,488,746 A | 2/1996 | Hudson | |
| RE35,236 E | 5/1996 | Nolen, Jr. | |
| 5,643,507 A | 7/1997 | Berrigan et al. | |
| 5,658,641 A | 8/1997 | Berrigan et al. | |
| 5,665,943 A | 9/1997 | D'Antonio | |
| D395,780 S | 7/1998 | Denney et al. | |
| 5,785,851 A * | 7/1998 | Morris et al. | 210/489 |
| 6,017,377 A | 1/2000 | Brown et al. | |
| 6,071,419 A | 6/2000 | Beier et al. | |
| 6,159,258 A | 12/2000 | Ager et al. | |
| 6,231,646 B1 | 5/2001 | Schweizer et al. | |
| 6,273,938 B1 * | 8/2001 | Fanselow et al. | 95/90 |
| 6,372,076 B1 | 4/2002 | Ogle | |
| 6,409,805 B1 | 6/2002 | Beier et al. | |
| D467,118 S | 12/2002 | McClure et al. | |
| 6,500,292 B1 | 12/2002 | Mossbeck et al. | |
| 6,585,793 B2 * | 7/2003 | Richerson et al. | 55/521 |
| 6,596,387 B2 | 7/2003 | Ogle | |
| 6,602,328 B2 | 8/2003 | Doi et al. | |
| 6,740,610 B2 | 5/2004 | Mossbeck et al. | |
| 6,790,397 B2 * | 9/2004 | Richerson et al. | 264/154 |
| 6,923,911 B1 | 8/2005 | Beier et al. | |
| 7,008,469 B2 | 3/2006 | Vetter et al. | |
| 7,008,691 B2 | 3/2006 | Ogle | |
| D527,565 S | 9/2006 | Contreras | |
| 7,452,589 B2 | 11/2008 | Mossbeck et al. | |
| 2002/0083692 A1 | 7/2002 | Richerson et al. | |
| 2004/0088958 A1 | 5/2004 | Richerson et al. | |
| 2004/0129493 A1 | 7/2004 | Campbell | |
| 2004/0231915 A1 | 11/2004 | Thomson, Jr. et al. | |
| 2005/0223686 A1 * | 10/2005 | Jeong | 55/497 |
| 2005/0279574 A1 | 12/2005 | Halterbeck et al. | |
| 2006/0000196 A1 | 1/2006 | Beier | |
| 2006/0016753 A1 | 1/2006 | Sowemimo-Coker | |

* cited by examiner

FIG. 19
−PRIOR ART−
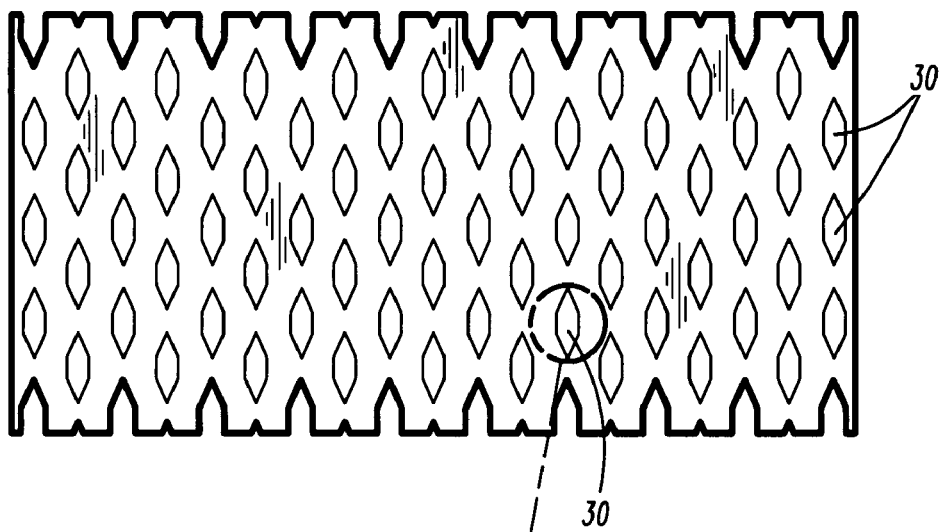
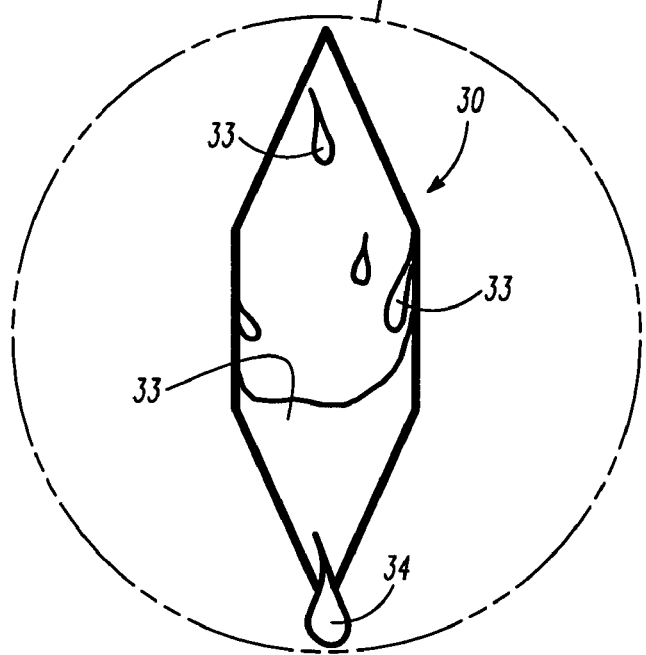
−PRIOR ART−
FIG. 19a

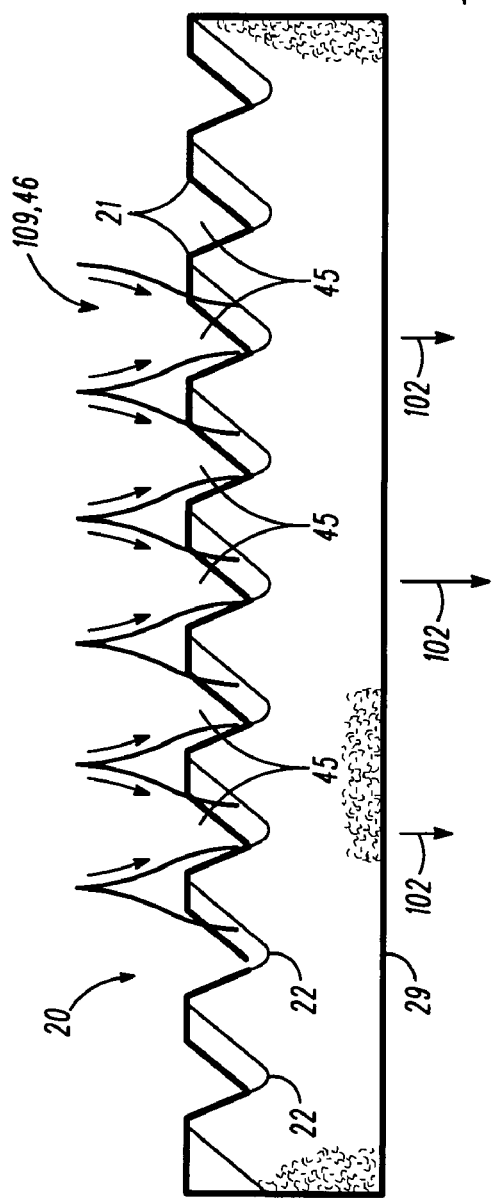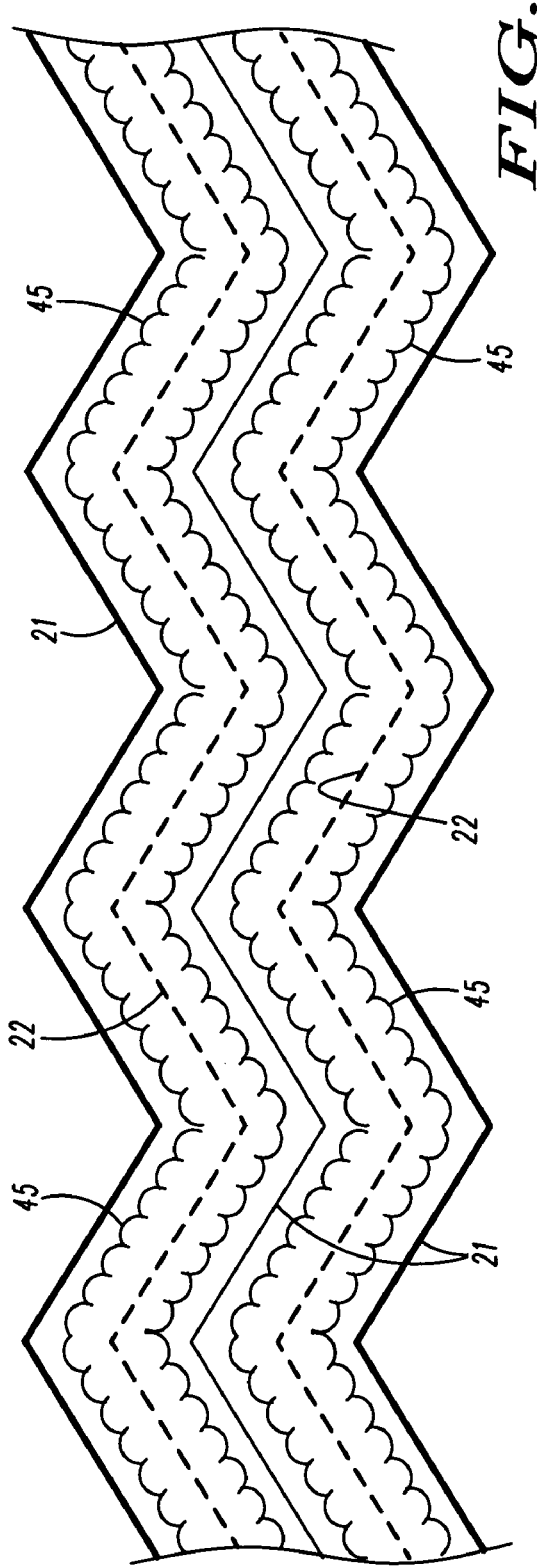

FILTERING METHOD

BACKGROUND OF THE INVENTION

1. Technical Field

The present invention generally relates to disposable filters for paint over spray collection or filters for fluid streams. More particularly, the present invention relates to a nonwoven batting which is sliced to produce two filters simultaneously with three-dimensional waveform or zigzag patterns formed upon the fluid-receiving anterior filter surface.

2. Description of the Prior Art

In recent years federal and state governments have instituted laws pertaining to the paint industry and in particular to the chemical formulations of paints and minimum performance efficiencies of paint over spray collection devices. The essential driving force behind these laws is to decrease the emissions of volatile organic compounds and paint particulate into the atmosphere. To achieve these ends, the laws require a decrease in the solvent content permitted in paint formulations and establish efficiency criteria in the collection of particulate. The result is the improved quality of the atmosphere.

The resulting changes in paint formulations created new coating formulations, including, but not limited to, so-called "high solids" formulations and "water born" formulations. These newly developed coating formulations have thus presented filter manufacturers with a need to develop new filter constructions to more effectively filter the particulate from solvents during various paint processes, since the new coating formulations were difficult to collect in the previous types of filters for paint over spray and fluid particulate collection. Hence many innovations have been designed and introduced to improve the performance criteria of paint over spray and fluid particulate filters.

Performance of any paint over spray collection or fluid stream filter is measured by four criteria: efficiency, holding capacity, run off, and resistance. Efficiency is the ability of the filter to capture and retain paint and other fluid particulate from the air stream. It is defined as a percentage of the total particulate introduced to the filter; the higher the removal efficiency, the more effective the filter. Less paint or fluid particulate is emitted in the atmosphere. Holding capacity is defined as the amount of paint, defined by weight that the filter retains during its service life. The higher the holding capacity, the less paint runs onto the floor of the booth and the longer the service life of the filter. Less paint on the floor decreases clean up down time of the booth. Longer service life decreases filter change frequency and reordering. Run off is the amount of paint or fluid the filter knocks out of the air stream but does not hold. The paint or fluid runs off the filter onto the floor of the booth. Run off is defined by weight; the less run off, the less clean up expenses and production downtime in the paint booth.

Resistance measures the ease of the air passing through the filter. Resistance is the vacuum differential at the air leaving side of the filter. The initial resistance, initial pressure drop or IPD, is the measurement of a clean filter. The final resistance, final pressure of FTP, is the measurement of a paint-ladened filter at the end of its service life. The measurement is defined as a vacuum pulling a column of water up an incline tube. As a side to understanding, it is similar to the relationship between temperature and mercury rising in a glass thermometer. The higher the resistance, the more power is required to drive fans and motors which pull the air through the filters.

The resistance is critical to the proper design and operation of paint booths. Resistance controls fan size, horsepower, air movement requirements and booth balance. Lower resistance also increases the service life of the filters because the final resistance is set as criteria of the paint booth design. Therefore, if you begin at a lower pressure drop, it takes longer in time to reach the final pressure drop. All new art innovations in paint over spray and fluid filters are designed to improve some or all of the four criteria mentioned above. However, certain difficulties arise and a balance or compromise has to be found in the improvements.

Increasing removal efficiency is typically achieved by adding density through a tighter weave, smaller fiber, or more plies in the filter. Though an improvement in efficiency may be achieved, historically this will decrease holding capacity and increase paint run off and resistance. The balance can be realized if face area, square feet, could be added to the filter. This would allow an increase in efficiency through densification of fiber and not adversely affect other performance criteria. Some of the more pertinent prior art relating to fluid filters and the like addressing the foregoing filter aspects are briefly described hereinafter.

U.S. Pat. No. 4,019,987 ('987 patent), which issued to Krasnow, discloses Extended Area Filters. The '987 patent teaches an extended-area filter for filtering plastic stock at high pressures has a breaker plate with an undulating surface confronting the oncoming stock which substantially doubles the available filter area. Screen packs having fixed therein the same surface configuration are supported uniformly on the undulating surface against collapse under the operating pressure.

U.S. Pat. No. 4,904,288 ('288 patent), which issued to d'Augereau, discloses a Filter Element for Circulating Air Systems. The '288 patent teaches a reusable air filter assembly for use in forced air heating and cooling systems includes an inlet stage filter medium consisting of a single layer of fabric woven in an egg-crate pattern and of relatively coarse polypropylene yarn, an outlet stage filter medium consisting of two layers of fabric woven in an egg-crate pattern of relatively fine polypropylene yarn and a precipitation chamber between said inlet stage and said outlet stage defined by a corrugated aluminum wire screen, with the precipitation chamber having a thickness, in the direction of air flow through the assembly, which is at least equal to the combined thickness of the inlet stage filter medium and the outlet stage filter medium. The filter assembly is supported in a corrosion resistant frame by opposing grid covers of expanded metal having a low friction coating thereon.

U.S. Pat. No. 5,034,042 ('042 patent), which issued to Allen, Jr., discloses a Structure and Filter for Paint Spray Booth. The '042 patent teaches a structure and a filter suitable for a paint spray booth, oven, or a combination booth and oven is described and includes outer walls enclosing the structure, only a portion of which provides the structural support for the booth's walls and roof. The interior of the booth has a plurality of filters on the walls and ceilings for supplying air from essentially the walls and ceiling to provide a more uniform air flow so that the painter is less exposed to vaporizing solvents, and when used as an oven, the heating is more uniform. Each of the filters made of a cloth material held in place by filter frames and may be used with either battens fixed to the frames or removable and held in place in pockets provided in the filter cloth.

U.S. Pat. No. 5,114,448 ('448 patent), which issued to Bartilson, discloses a high reliability, non-blocking air filter for filtering large volumes of low pressure air from equipment to be maintained free of dust and impurities while being ventilated during operation is disclosed. The filter media is mounted in a frame having a U-shaped cross section construction, which is attached over an air intake opening of the piece of equipment. The filter media includes a planar base surface and a plurality of projections. The tops of the projections define a surface above said planar base surface for supporting free-flowing articles so as such that these articles do not obstruct the air flow through the air intake filter.

U.S. Pat. No. 5,643,507 ('507 patent) and U.S. Pat. No. 5,648,641 ('641 patent), which issued to Berrigan et al., describe Filter Media having an Undulated Surface. The disclosed filter media comprise a web of melt blown microfibers having one surface substantially flat and the other surface having periodic wrinkle-like undulations. A method of making the filter media is also provided. The filter media is useful in electret filters when charged.

U.S. Pat. No. 6,071,419 ('419 patent), which issued to Beier et al., discloses a Fluid Filter, Method of Making and Using Thereof. The '419 patent teaches a fluid filter of a type akin to Paint Pocket type filter and includes a first batting of high loft, non-woven, fibrous fluid-permeable material with a plurality of openings formed through the thickness thereof across the length and width of the batting. A second layer of high loft, non-woven, fluid-permeable fibrous batting is attached to the first layer and extends across the entire length and width of the first layer. Preferably, the first and second layers are adhered together to form a single integral fluid filter. In the preferred form of the invention, the openings in the first batting have side walls which are perpendicular to the upper surface of the batting, such that fluid flow impacts on the upper surface of the batting, rather than directly impacting on the side walls.

U.S. Pat. No. 6,159,258 ('258 patent), which issued to Ager et al., describes a air filter elements with primary filter medias have foam pre-cleaners with an increased surface area provided by an upstream face which has peaks and valleys. In one embodiment, the peaks and valleys are defined by parallel ribs. If the filter element is a panel-type filter element having a pleated primary filter media, then, in accordance with one embodiment, the pre-cleaner is secured to the primary filter media by adhesive deposits on the peaks of the primary filter media. If the filter element is annular, the pre-cleaner is also annular and is slid axially over a perforated sleeve or screen on the primary filter media and held thereon by friction. By having the upstream surface of the foam pre-cleaner configured in peaks and valleys, the surface area of the upstream surface is increased substantially, which improves the capacity, efficiency and life of the filter element.

U.S. Pat. No. 6,602,328 ('328 patent), which issued to Doi et al., describes a gas turbine suction air filter which is provided wherein, despite a large capacity, dust is easily removed by an ultrasonic washer. A gas turbine suction air filter (1) has a box-like frame member (3) and a filter cloth (5) contained in the frame member (3). The frame member (3) is made of a metal material, preferably a stainless steel. The filter cloth (5) is formed having many pleats so that many folded faces (7) are formed. No intervening member is provided between adjacent folded faces (7, 7), with only a space being arranged there. The filter cloth (5) is a non-woven fabric of a synthetic resin fiber, preferably a polypropylene fiber. While this filter (1) has a large capacity, an ultrasonic wave reaches the entire filter cloth (5) when the filter (1) is washed by an ultrasonic washer.

U.S. Pat. No. 6,923,911 ('911 patent) which also issued to Beier et al., discloses a Method of Filtering Air Through an Air Passageway. The '911 patent describes a filter system for filtering particulate material from a generally unidirectional fluid stream comprising a first filter removably positioned in the fluid stream and a second filter removably positioned in the fluid stream downstream of the first filter. The first filter comprises a pre-filter and includes a layer of fluid-permeable material having a plurality of spaced-apart openings extending completely therethrough. The method of utilizing the fluid filter system of this invention is also disclosed and comprises the steps of: (1) removably positioning a first filter in the fluid stream; and (2) removably positioning a fluid-permeable second filter in the fluid stream downstream of the first filter. The first filter may be removed from the fluid when it becomes restrictive to air flow. The system may be operated so that the air may be passed through the second filter until the second filter becomes clogged or restrictive to air flow. The filters may be positioned in an air discharge passageway associated with a paint spray booth or may be positioned in an air intake passageway extending into a heating system, a ventilating system or an air conditioning system.

United States Patent Application No. 2002/0083692, which is authored by Richerson et al., teaches a filter apparatus for removing air entrained particles comprising a pleated filter media. A first media member has a plurality of alternating upstream and downstream folds and a wall connecting the folds. A pair of slits forms an aperture and a hinged pleat. A second media member matingly attaches to the first media member. United States Patent Application No. 2004/0088958, which is also authored by Richerson et al., teaches a filter apparatus for removing air entrained particles comprising a pleated filter media. A first media member has a plurality of alternating upstream and downstream folds and a wall connecting the folds. A pair of slits forms an aperture and a hinged pleat. A second media member matingly attaches to the first media member.

United States Patent Application No. 2006/0000196, which was authored by Beier et al., teaches a fluid filter which comprises a layer of high loft, non-woven, fibrous, fluid-permeable material having a length and a width, an upper surface, a lower surface, and a non-constant thickness measured between the upper and lower surfaces. The non-constant thickness is achieved by providing a series of spaced-apart grooves separated by a series of spaced-apart ridges. The lower surface is substantially planar and the grooves each have a generally U-shaped cross section with the ridges having a generally inverted U-shaped cross section. A modified form of the invention is also disclosed wherein the zones of higher flow resistance have a greater density than the zones of lower flow resistance. In this embodiment, the thickness of the filter is constant. The method of filtering particulate material from a fluid stream is also disclosed.

Of the various prior art filter constructions, perhaps two of the most effective are taught by Beier et al. in the '419 patent and the '805 patent. State of the art filter technology in the paint over spray and fluid filter industry include filters constructed from fiberglass, paper, polyester, and combinations of the above. The material advantages and disadvantages of incorporating these types of filtering media into a filter construction are well presented in the '419 and '805 patents. The noted patents further specify that filters for use in the paint overspray industries regularly have an overall length by width dimension of 20×20 inches. If the fluid-engaging surface were substantially planar, these dimensions would yield a maximum fluid-receiving surface area of roughly 2.78 square feet or 400 square inches. Notably, however, the '419 and '805 patents do not teach a fluid-engaging surface that is substantially planar or uniform.

The art represented by '419 and '805 patents essentially comprise two distinct layers of polyester batting fastened together in plies. The first or anterior layer comprises roughly teardrop, diamond, or ellipsoidally shaped apertures having a substantially uniform depth while the second or posterior layer is of uniform construction without apertures. The first or anterior later thus forms so-called "paint pockets" upon the second or posterior layer. The second ply or air-leaving ply is of a finer denure fiber weave for enhancing the filtering effect of the filter. A primary shortcoming with this construction is that at its very beginning of operation or service life, the paint laden air entering the filter bypasses the first or anterior layer and enters the filter by way of the paint pocket apertures, since filtered fluid streams follow the path of least resistance through the filtering plane(s) and the apertured regions represent pockets of decreased flow resistance. This mechanism negates many of the filtering benefits that the apertured layer may have otherwise contributed to the filtering effect of the filter.

Bearing in mind that the Beier et al. paint pockets may be roughly modeled as ellipsoidally shaped apertures, and taking a 20 inch by 20 inch filter as an exemplary filtering plane, the Beier et al. filter comprises roughly 110 paint pockets in any given 20×20 filter. Each paint pocket comprises a major axis of about 2 inches and a minor axis of about 1 inch. The area of an ellipse is given by the relation: $A_{ellipse} = \pi a\, b$, where "a" is the semimajor axis (a=1 inch=one half the length of the major axis) and "b" is the semiminor axis (b=½ inch=on half the length of the minor axis). The transverse fluid-receiving area of a single paint pocket is thus roughly 1.6 square inches. If this figure is multiplied by the number of paint pockets (110) in a given filter, the effective initial fluid-collection surface area is roughly 175 square inches paint pocket is thus on the order of less than or about half the total available filtering surface area.

Notably, there is only one layer of media at the bottom of the paint pocket, and thus there is less initial resistance to fluid flow because the fluid or air is essentially passing through only one layer of media. Therefore, the air flow through the paint pocket initially experiences a higher air flow rate and thus collects more paint or fluid particulate until the resistance to fluid flow at the paint pocket equals the resistance of the area represented by the two ply sections of the filters. Other avenues of decreased air flow resistance include the side walls of the paint pockets. For the air flow to pass through the side walls of the paint pocket it must deviate from a straight line path up to 90 degrees. However, as the name implies, particulate and solvent (paint overflow) is all the while collecting in the paint pocket and air flow continually and dynamically decreases. Beier et al. have attempted to remedy pocket collection of fluid-borne particulate as set forth by the construction disclosed in United States Patent Application Publication No. 2006/0000196. It may be seen from an inspection of the noted publication that Beier et al. have attempted to round the upper fluid-receiving or fluid-contacting surfaces so that air flows drawn into the filter would not meet planar air-to-filter interfacing and for increasing the filtering surface area of the filter. Further, the anterior filter surface was sinusoidally contoured in one dimension for creating substantially linear channels for directly allowing paint run-off when installed such that the channels are longitudinal or vertical. This design, however, provides only a modest increase in filtering surface area and unimpeded paint run off poses a significant problem since the media should function to filter and hold paint overflows.

Given that hundreds of thousands of pounds of paint may be annually dispensed in any given painting operation, filter particulate removal efficiencies are critical for minimizing solvent effluent and other associated costs. By way of example, a filter quoted as providing a removal efficiency of 99.84% versus an actual tested removal efficiency of 99.71% yields an efficiency difference of 0.13%. If the painting operation is expecting to remove 99.84 percent of 500,000 pounds over overspray, while only removing 99.71 percent of 500,000 pounds of overspray is actually filtered, then roughly 650 pounds of overspray may go unreported and is unknowingly lost to the environment. Thus, it should be clear from the foregoing that enhancements in filter design are of critical importance to the industry and the environment.

SUMMARY OF THE INVENTION

Accordingly, it is primary object of the present invention to provide a fluid filter that maximizes removal efficiency (i.e. reduces environmentally discharged effluent) and reduces paint run-off in overspray paint applications. Further, it is a primary object to provide a maximally efficient filter a minimized cost to the manufacturer and the customer. Thus, it is a general object of the present invention to provide an improved paint over spray collection and fluid filter with uniquely configured, and cheaply manufactured anterior filter surface contour that, by structural configuration, functions to maximize the filtering surface area, and provide means for retarding paint run-off thereby overcoming many of the shortcomings otherwise inherently taught by the Beier et al. teachings.

To achieve these and other readily apparent objectives, the present invention essentially provides a fluid filter constructed from high loft polyester composed of various denure and high-low melt fibers for structural integrity. The whole parent batt is made in one pass through at a polyester mill. The parent batt in whole is passed through a convoluting machine which continually slices the one parent batt into two continuous child batts. The convoluter at the time of slicing cuts a patterned contour or landscape into both halves of the batt, such that the patterned contour of the first batt is the negative impression of the other, and thus the two filter batts are essentially produced with the same patterned contour simultaneously. The convuluter is a machine with rollers arranged in the horizontal and parallel to one another. Positioned intermediate the noted rollers is a cutting device. The rollers compress the parent filter batt while the continuously moving cutting device slices the media.

The roller of the convuluter effects a patterned contour with compressions points (peaks) and valleys which align with the corresponding peak(s) and valley(s) of the opposite roller. This method creates undulating, winding, or waveform peaks and valleys on the top or first filter mat which correspond or are negative impressions of the peaks and valleys of the bottom or second half. The two halves are thus nestable into one another. The resulting V-shaped o zigzag or waveform pattern is continuous and formed throughout the face of the filter and extends the entire width and length. The V-shaped zigzag pattern has a substantial peak-to-valley depth, which depth and zigzag pattern effectively function to significantly increase the filtering interface or filtering surface area of each filter produced by 50 percent. In this regard, a 20 inch×20 inch filter having a substantially planar filtering interface or filtering surface area of about 2.78 square feet or 400 square inches, may be improved according to the teachings set forth herein to provide a filtering surface area of about 4.17 square feet or about 600 square inches.

BRIEF DESCRIPTION OF THE DRAWINGS

Other features of my invention will become more evident from a consideration of the following brief description of my patent drawings, as follows:

FIG. 19 is an anterior plan view of a prior art pocket filter showing a plurality of paint-receiving pockets without run-off pathways.

FIG. 19(a) is an enlarged anterior depiction of a paint-receiving pocket otherwise shown in FIG. 19 with paint being collected and over-spilling from the pocket.

FIG. 20 is a fragmentary end view depiction of the fluid filter according to the present invention showing a waveform contour directing fluid streams into waveform currents at the anterior filter surface.

FIG. 21 is a fragmentary anterior plan view of the fluid filter structure otherwise depicted in FIG. 20 showing waveform current outlines relative to waveform peaks and waveform valleys.

DETAILED DESCRIPTION OF THE PREFERRED EMBODIMENT(S)

Figure 1:
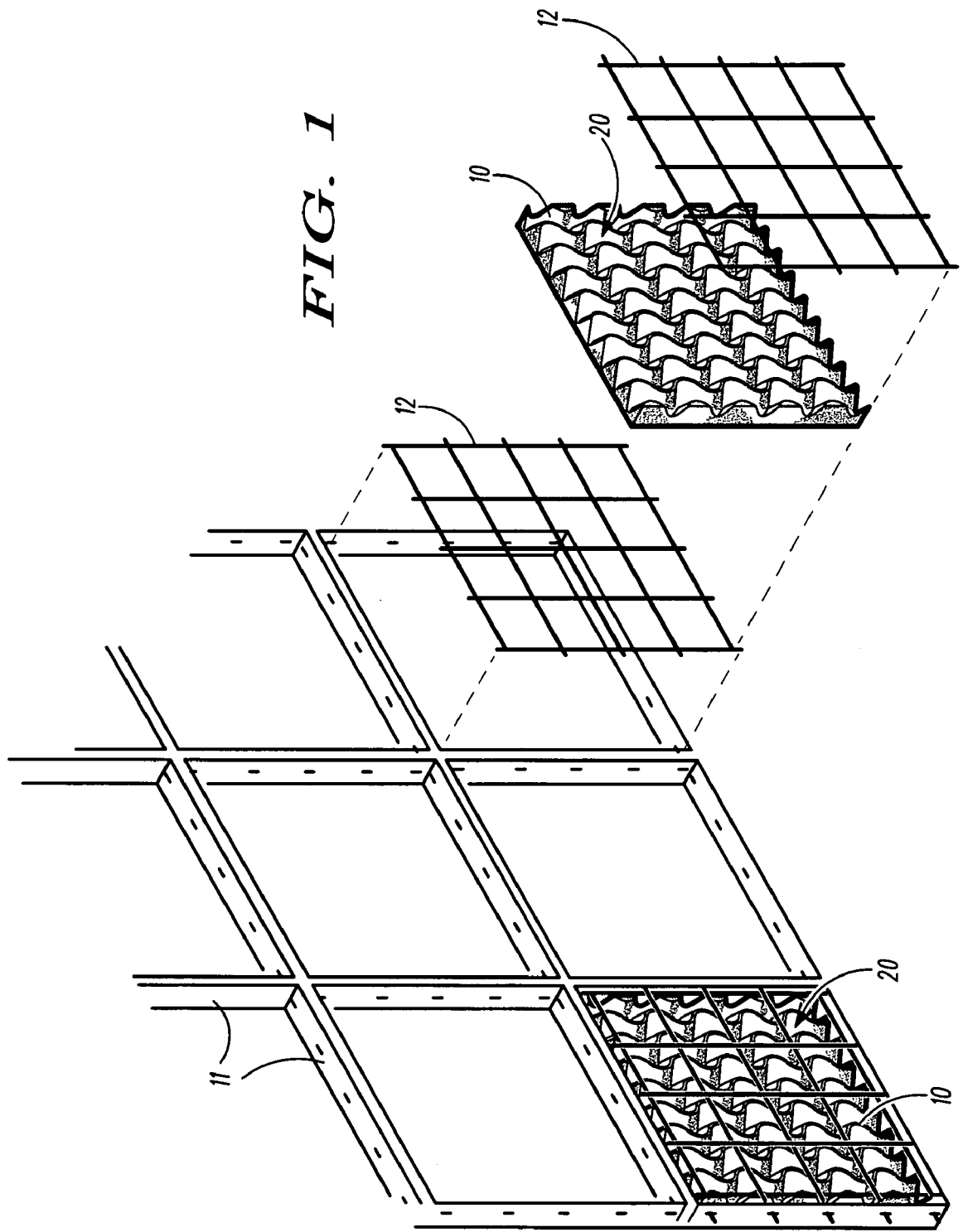
FIG. 1 is a fragmentary perspective view of a portion of a paint booth wall showing a plurality of filter-receiving panel assemblies, one fluid filter according to the present invention in assembled relation with a first panel assembly, and one fluid filter according to the present invention exploded from a second panel assembly.

Referring now to the drawings, the preferred embodiment of the present invention concerns a fluid filter 10 as generally illustrated and referenced in FIGS. 1-3, 5, 6, and 9-15. Fluid filter 10 is particularly designed for use in filtering air borne paint overspray 100 as may occur in paint booth operations, which paint overspray 100 is generally depicted and referenced in FIGS. 13-15. As may be readily understood from the foregoing portions of this specification, fluid filters of this general type are designed to prevent the introduction of particulate matter into the atmosphere. In this case, the fluid filter 10 has similarly been designed for preventing overspray effluent from leaving the paint booth operation.

Figure 2:
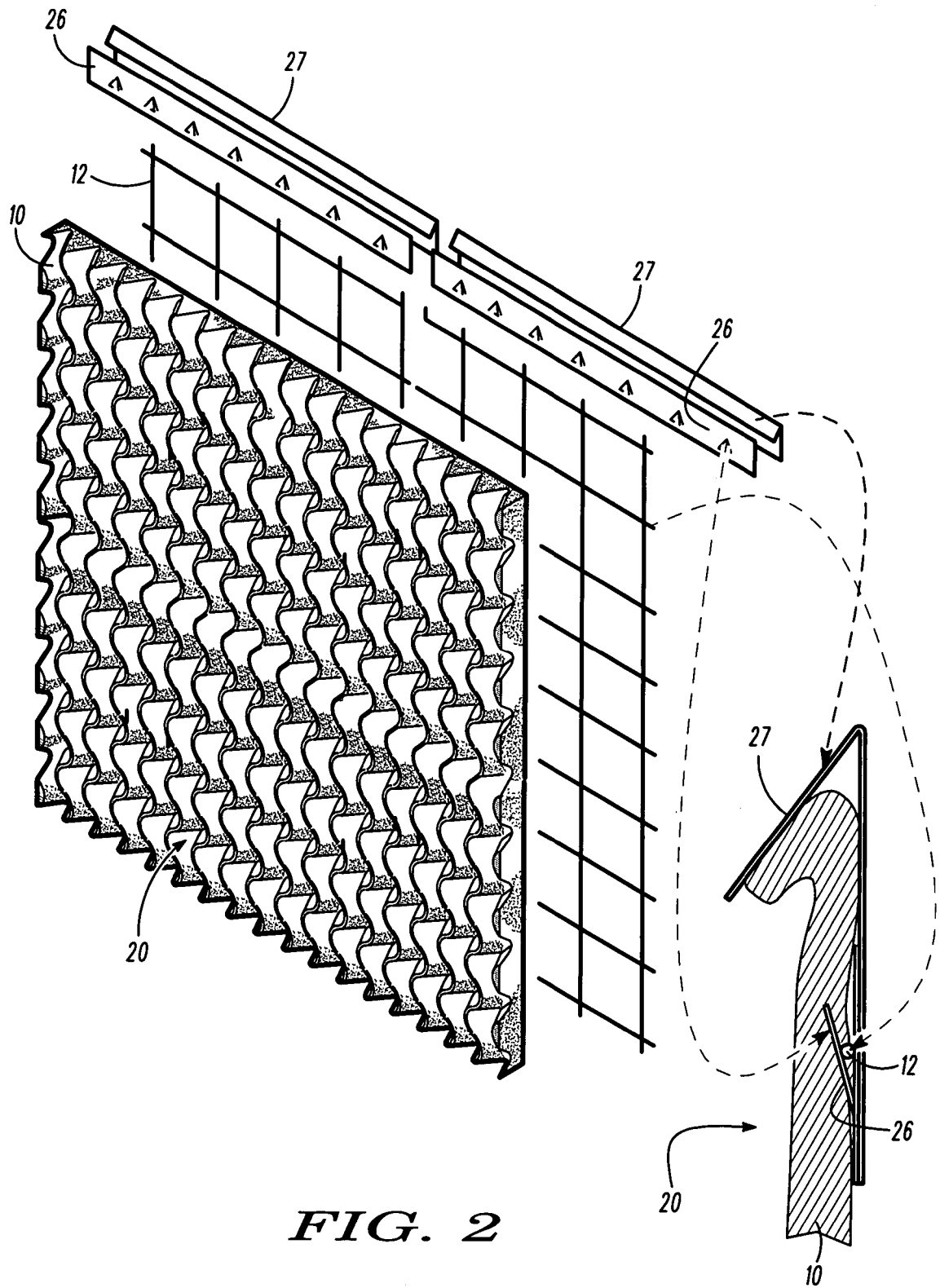
FIG. 2 is a dual depiction of a portion of a paint booth wall, the first depiction showing an enlarged fluid filter according to the present invention exploded from means for receiving and retaining the fluid filter in a paint booth, the second depiction being a fragmentary sectional view of a fluid filter attached to the means for receiving and retaining the fluid filter in a paint booth.
Figure 3:
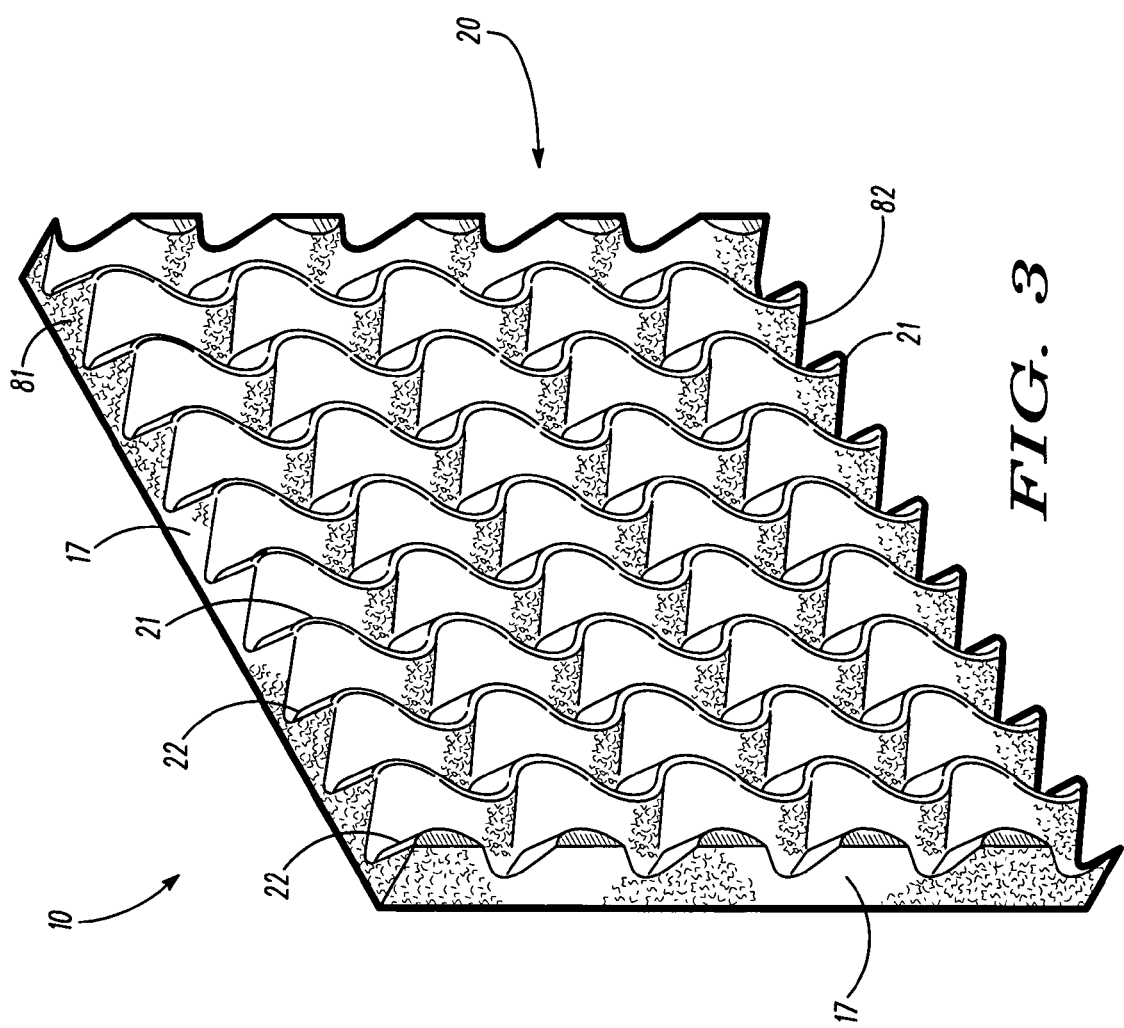
FIG. 3 is an anterior perspective view of a fluid filter according to the present invention showing a waveform landscape formed upon the anterior filter surface.
Figure 4:
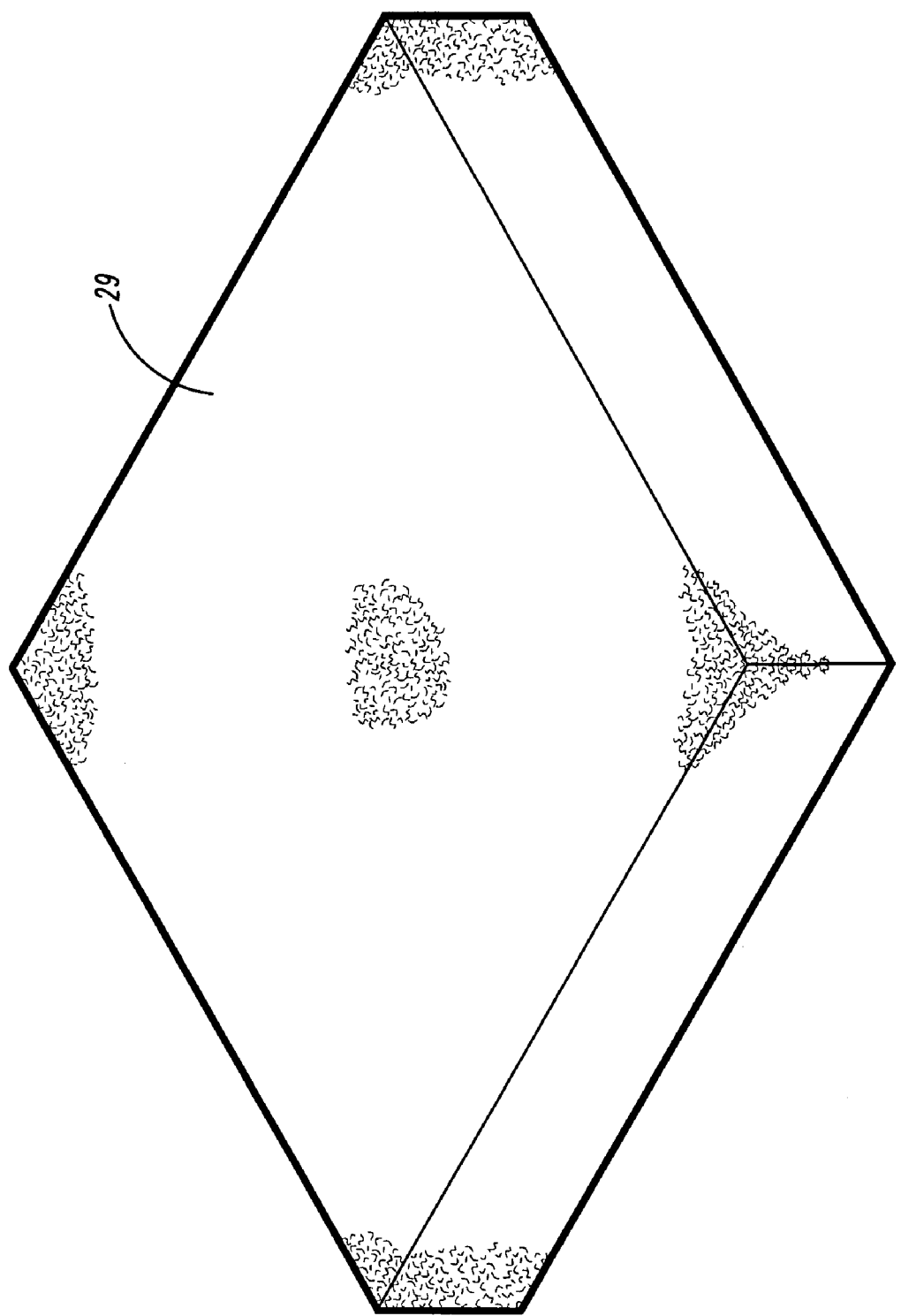
FIG. 4 is a first sequential perspective view of a block of fluid permeable material from which the fluid filter with waveform landscape according to the present invention may be formed.
Figure 5:
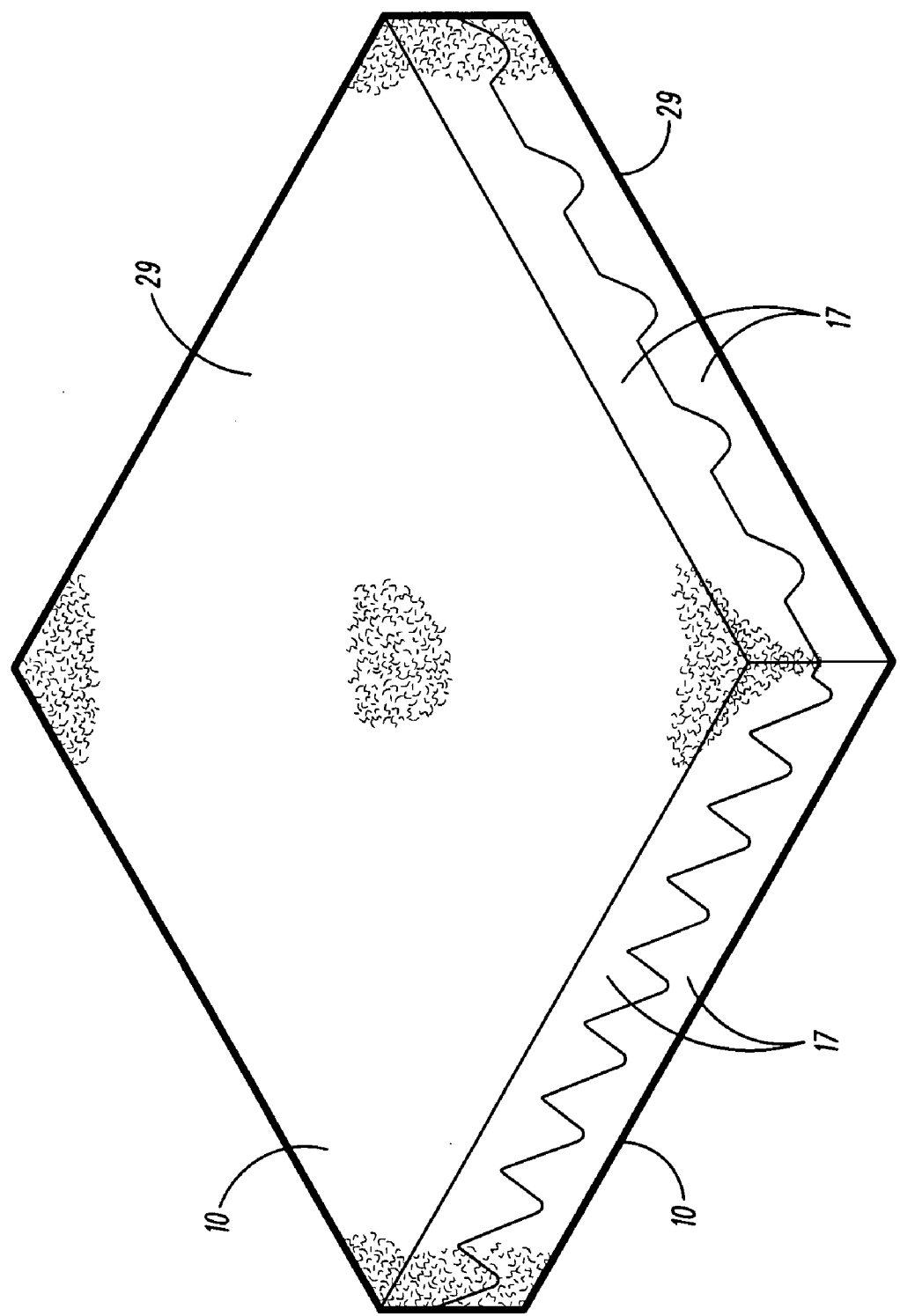
FIG. 5 is a second sequential perspective view of the block of fluid permeable material otherwise depicted in FIG. 4 having a waveform landscape formed therein thereby forming a first and second fluid filters as depicted in nested relation, the first fluid filter essentially being a negative impression of the second fluid filter.
Figure 6:
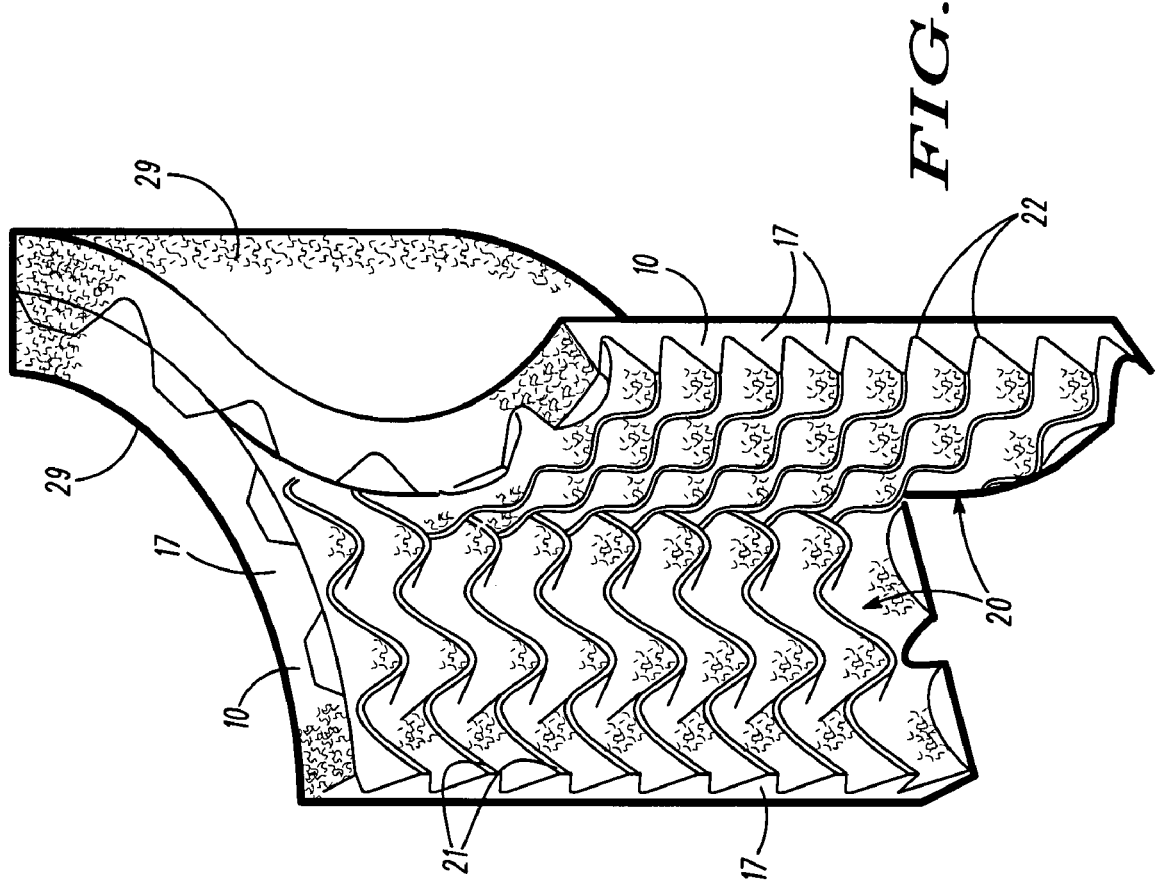
FIG. 6 is a third sequential perspective view of the block of fluid permeable material otherwise depicted in FIG. 5 the first fluid filter being removed from nested relation from the second fluid filter.
Figure 7:
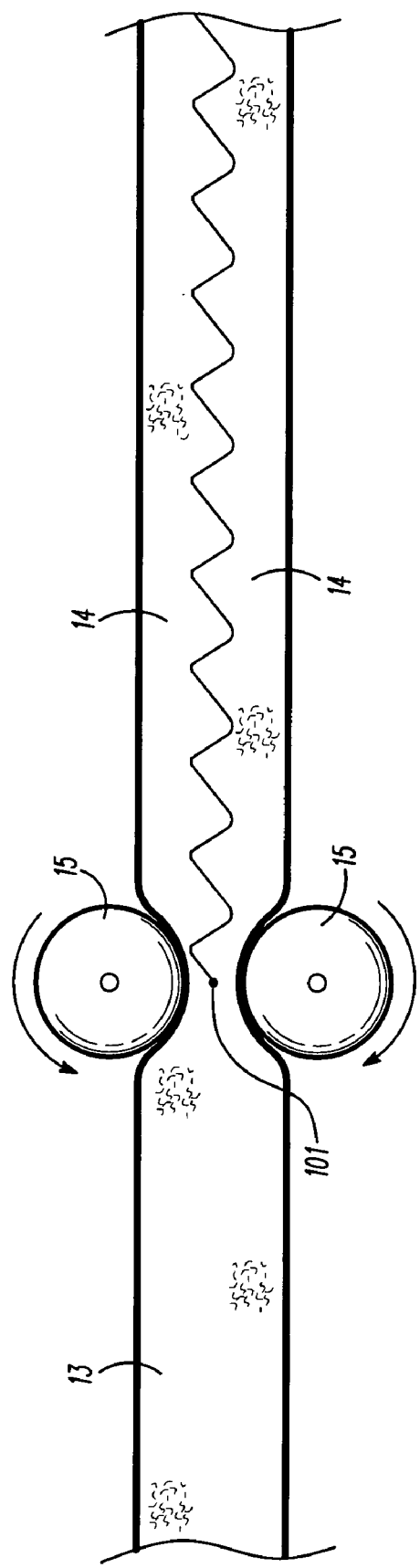
FIG. 7 is a fragmentary side view of a parent batting material being fed through a roller/slicing assembly for forming nested first and second child batts.
Figure 8:
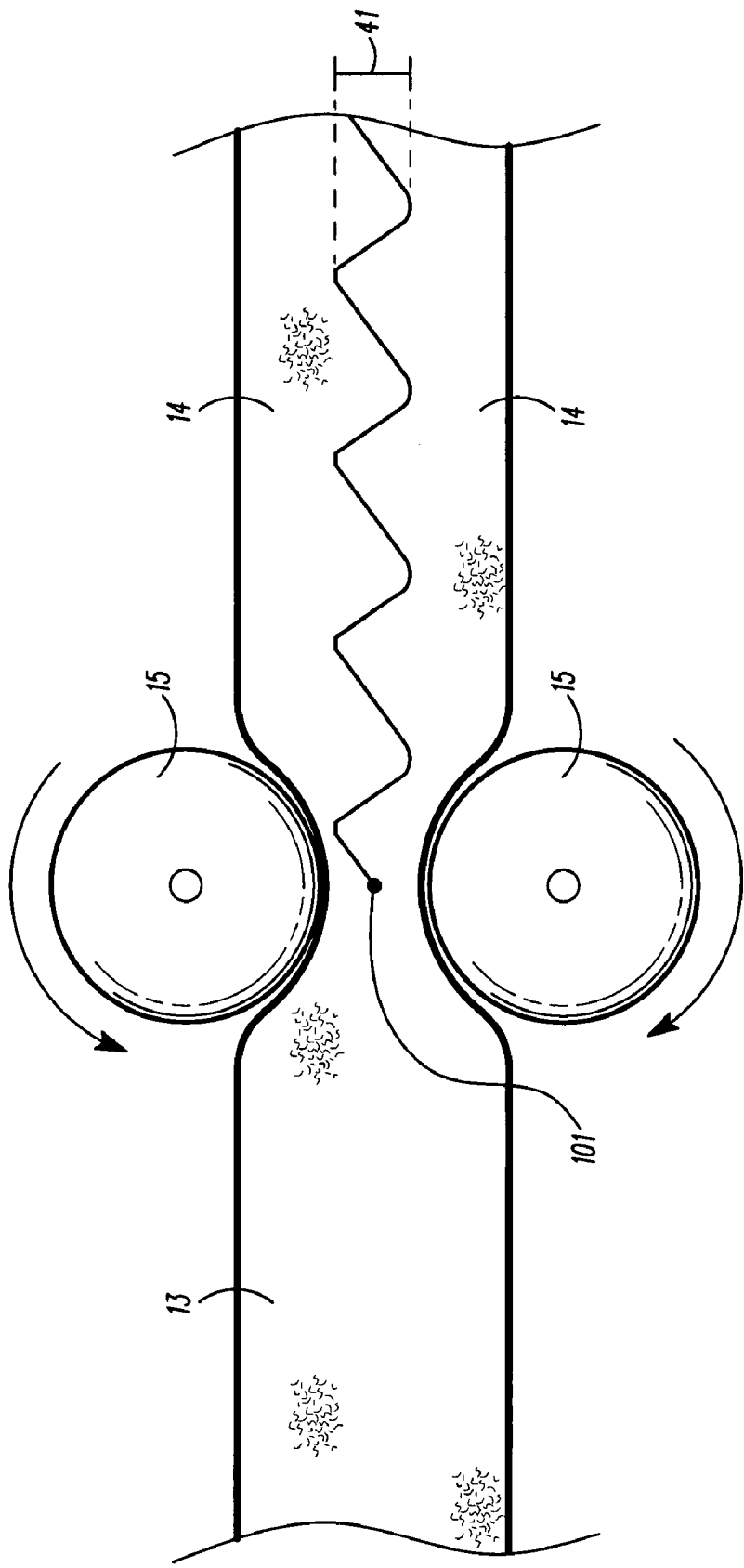
FIG. 8 is an enlarged fragmentary side view of the parent batting material being fed through a roller/cutting assembly otherwise depicted in FIG. 7.
Figure 9:
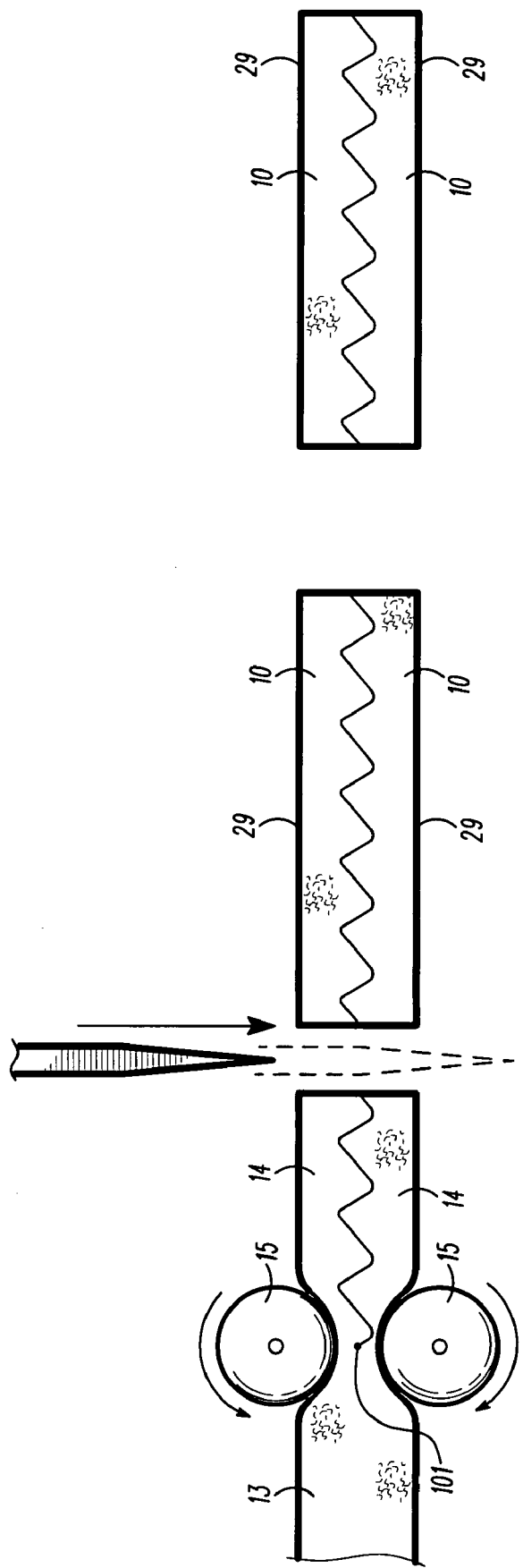
FIG. 9 is a fragmentary side view of an output end of the parent batting material otherwise depicted in FIG. 7 showing the nested first and second child batts being cut by way of a cutting assembly.
Figure 10:
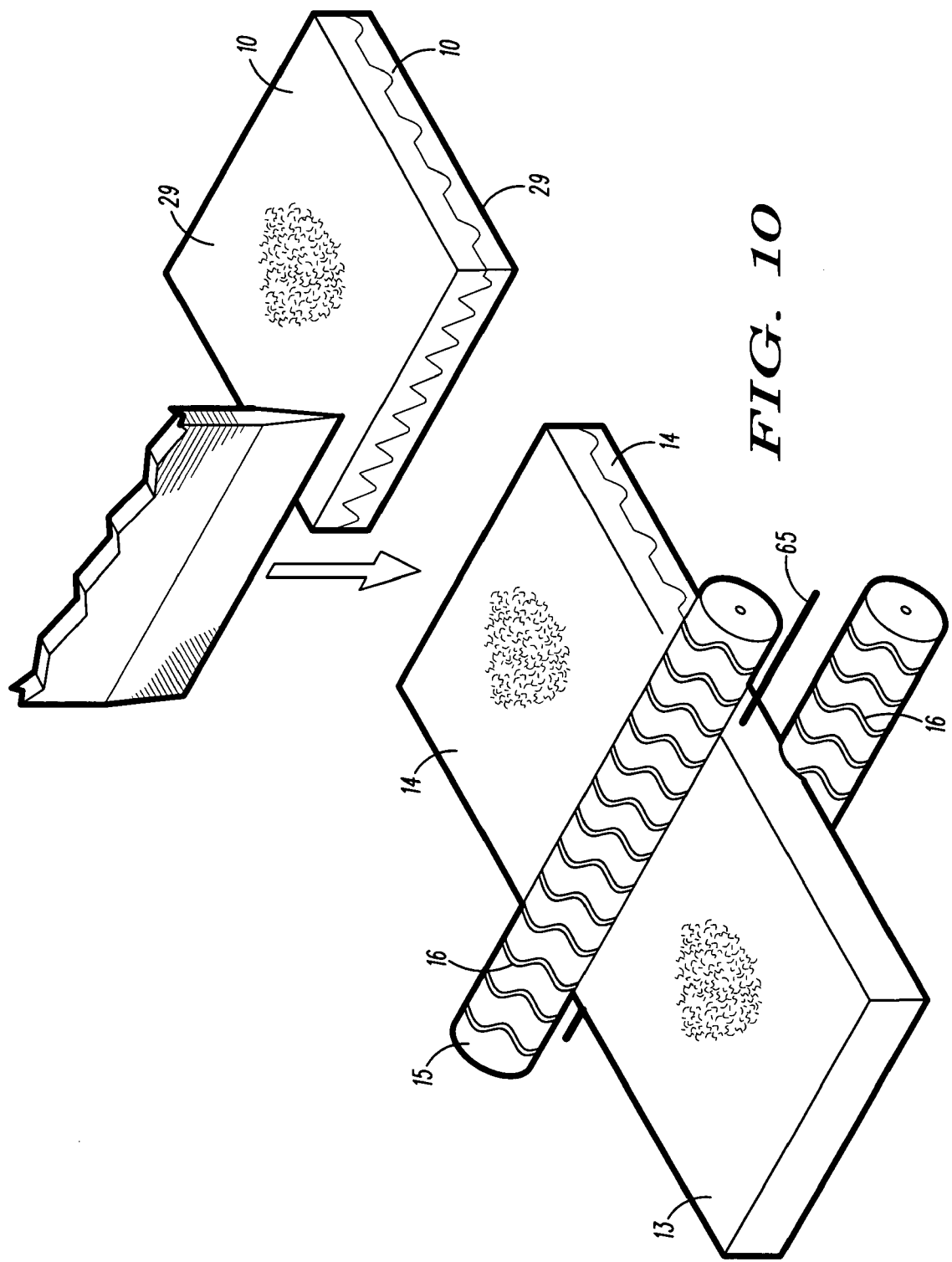
FIG. 10 is a fragmentary schematic perspective depiction of the output end of the parent batting material otherwise depicted in FIG. 9 showing first and second rollers having contoured superficial surfacing for forming the waveform landscape and the nested first and second child batts being cut by way of the cutting assembly.
Figure 11:
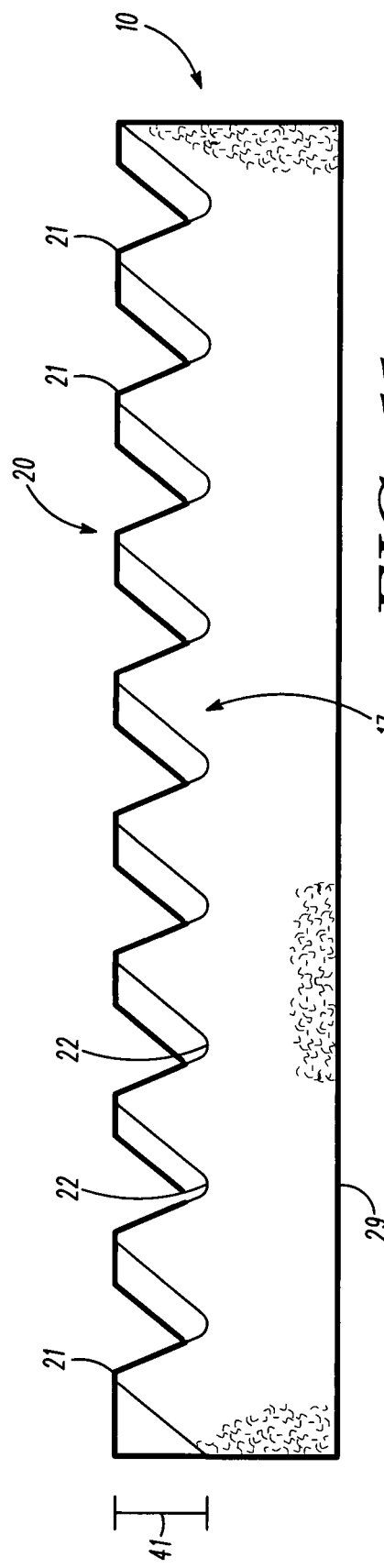
FIG. 11 is a fragmentary end view depiction of the fluid filter according to the present invention showing a waveform contour formed upon the anterior filter surface.
Figure 12:
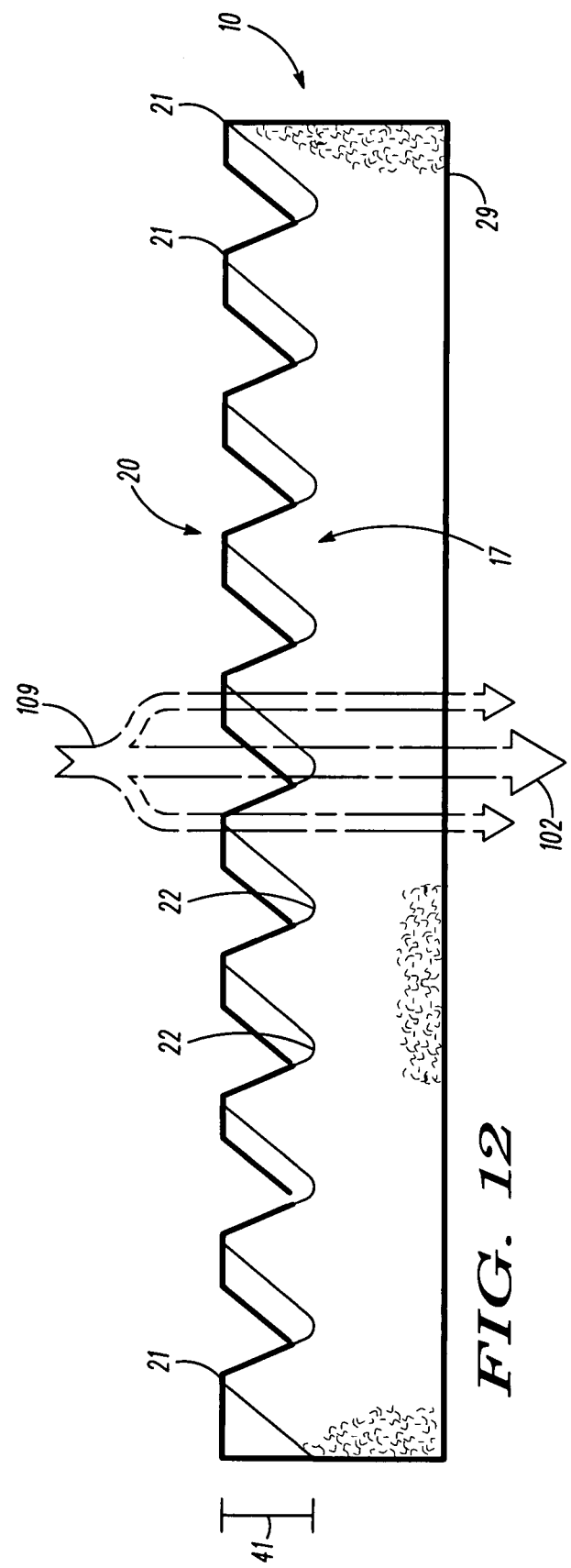
FIG. 12 is a fragmentary end view depiction of the fluid filter according to the present invention showing a waveform contour formed upon the anterior filter surface with a first schematic depiction of a fluid stream through the fluid filter.
Figure 13:
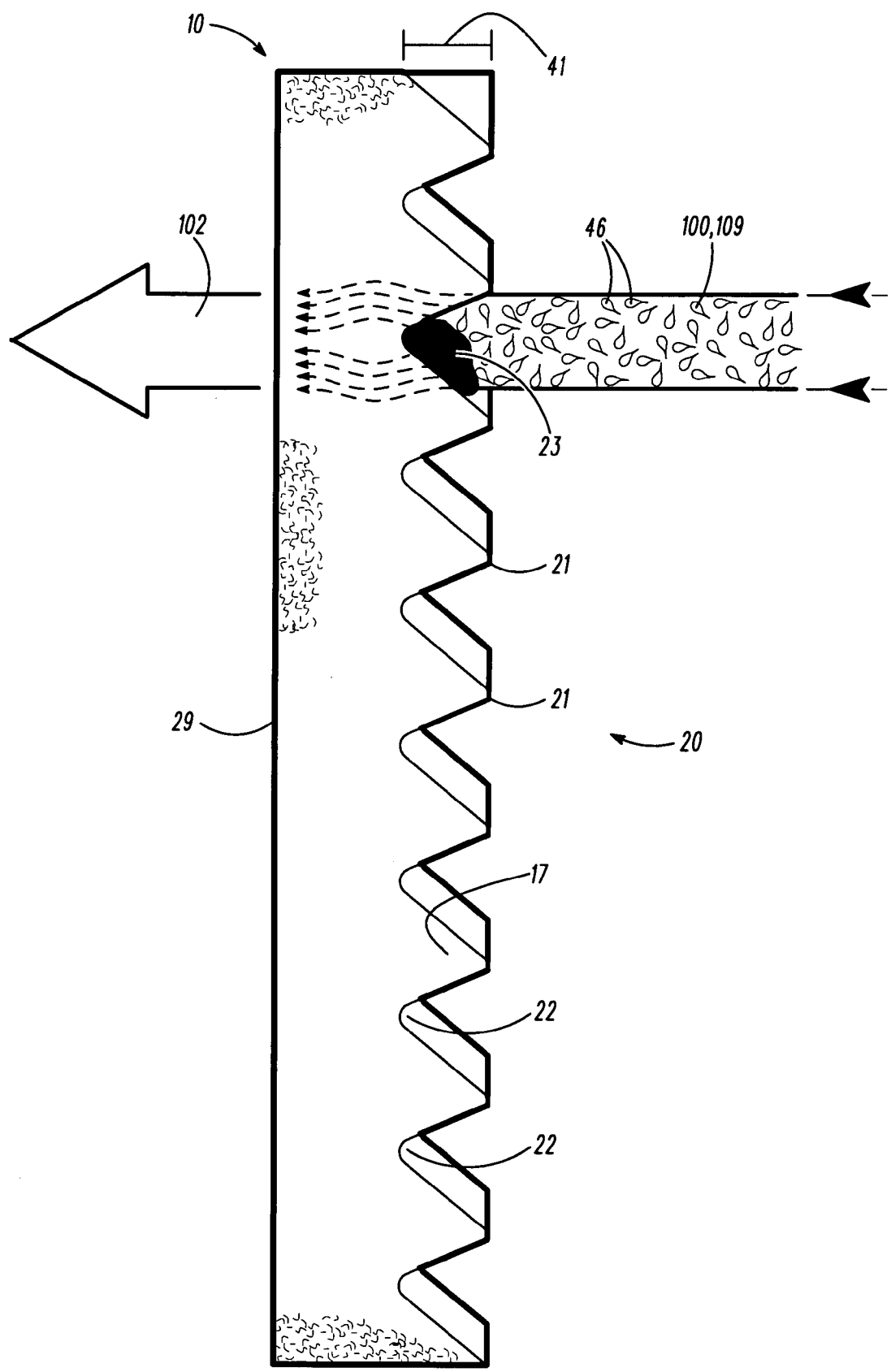
FIG. 13 is an enlarged fragmentary end view depiction of the fluid filter according to the present invention showing a waveform contour formed upon the anterior filter surface with a second schematic depiction of a fluid stream through the fluid filter.

A portion of a wall-like structure commonly found in paint booths is generally depicted in FIGS. 1 and 2. It may be seen from a comparative inspection of FIG. 1 that a plurality of filter panel assemblies 11 may be assembled in a side-by-side arrangement for receiving and spatially orientating a plurality of standard fluid filters of general types, including the fluid filter 10 according to the present invention. Certain hooked or barbed panels 26 may well function to grab the fluid filters 10 as further received and curled within angled panels 27 as generally and comparatively depicted in FIG. 2. It is believed that filter panel assemblies 11 of the type generally depicted in FIGS. 1 and 2 are relatively well known in the art, and that no further specification thereof is absolutely required.

However, brief mention should perhaps be made of the fact that state of the art filters, and fluid filter 10, are typically sandwiched between anterior and posterior grid like structures 12, as may be constructed from heavy gauge wire or rods as generally depicted and referenced in FIG. 1. FIG. 2 depicts a posterior grid-like structure 12 (without a corresponding anterior grid-like structure 12). The drawings being here referenced have been included in this specification for clarity of reference, and no claim is particularly being made the specific construction of the filter panel assemblies 11 or grid-like structures 12. Further, it is believed that the grid-like structure 12 does not significantly alter the performance of the waveform landscape generally formed upon the anterior filter surface 20 of the fluid filter 10.

In other words, the fluid filter 10 according to the present invention is designed for cooperative assemblage with standardized paint booths, which have been generically depicted in fragmentary portion in FIGS. 1 and 2. As earlier stated, the fluid filter 10 of the present invention is preferably constructed from high loft polyester composed of various denure and high-low melt fibers for structural integrity. A high loft polyester batting is processed at a polyester mill as generally depicted in FIGS. 7-10. It may be readily understood from an inspection of the noted figures that a parent batting 13 of the general material construction herein specified is passed through a convoluting machine, which machine functions to continually slice the parent batting 13 into two continuous child batts 14 as further illustrated and referenced in the noted figures.

The convoluting machine, at the time of slicing, cuts a patterned contour or waveform landscape into both halves of the parent batting 13 (as at reference numeral 101), such that the patterned contour of the first child batt 14 is the negative impression of the second child batt 14, and thus the two children filter batts 14 are essentially produced with the same patterned contour simultaneously. The convoluting machine comprises cylindrical rollers 15 with uniquely contoured media-engaging surfaces 16 and arranged parallel to one another as generally further depicted and referenced in FIGS. 7-10. Positioned intermediate the noted rollers 15 is a cutting device as at 65 in FIG. 10. The rollers 15 and contoured media-engaging surfaces 16 dynamically compress the parent filter batting 13 in a first direction or plane as batting 13 translates in a second direction or plane orthogonal to the first direction. The cutting device 65 thereby continuously slices the media of the parent batting 13 for effecting the contoured landscape result.

In other words, the rollers 15 and surfaces 16 of the convoluting machine effect a patterned contour by way of peaks and valleys formed upon the media-engaging surface(s) 16 of the first roller 15 which align with the corresponding peak(s) and valley(s) of the media-engaging surface(s) of the opposite roller 15. This method creates undulating, winding, or waveform peaks and valleys on the top or first filter mat which correspond or are negative impressions of the peaks and valleys of the bottom or second half. The two halves are thus nestable into one another as generally and comparatively depicted in FIGS. 5, 6, 9, and 10. The resulting V-shaped zigzag or waveform pattern is continuous and formed throughout the anterior filter face or surface 20 of the fluid filter 10. Notably, the waveform result 17 extends in both the length dimension and the width dimension. In other words, anterior face waveform patterns occur along the rectangular boundaries 17 of the fluid filter 10 as well as across the length and width of the fluid filter 10, as may be generally seen from an inspection FIGS. 3, 5, 6, 11-13, and 15.

The preferably parallel V-shaped zigzag or waveform patterns formed upon the anterior filter surface 20 of the fluid filter 10 thus define waveform peaks 21 and waveform valleys 22, which have a substantial peak-to-valley depth. Together the peak-to-valley depth and zigzag pattern effectively function to significantly increase the magnitude of the filtering interface or filtering surface area of each fluid filter 10 produced by about 50 percent (as compared to a planar filtering interface). As earlier noted, a 20 inch×20 inch fluid filter having a substantially planar filtering interface or filtering surface area of about 2.78 square feet or 400 square inches, may be improved according to the teachings set forth herein to provide a filtering surface area of about 4.17 square feet or about 600 square inches.

The manufacturing technology utilized to effect the landscape patterns is believed to be relatively standard to industries geared away from forming filtering media, but is here being applied to the paint filter industry for effecting the specific filtering landscape contour of fluid filter 10. While no particular claim is being made to the method of manufacture heretofore addressed, the waveform peaks 21 and waveform valleys 22 formed upon the anterior filtering surface 20 of the present fluid filter 10 are being claimed. The waveform landscape formed upon the anterior filtering surface 20 of the fluid filter 10 provides excellent geometry for filtering paint overspray 100, which, as test results have shown, is superior to other state of the art filtering geometries as perhaps best exemplified by the Beier et al. teachings.

Tests were run on the "paint pocket" filter as exemplified in the '419 and '805 patents (generally depicted in FIG. 19) and compared to test results for the fluid filter 10 or "waveform" filter according to the present invention for (1) a solvent based quick dry enamel formulation, and (2) a high-solids permaclad formulation. Particular attention was given to (1) paint run-off data and (2) the overall average particulate removal efficiency. For the quick dry enamel formulation, the "paint pocket" fluid filter allowed one hundred thirteen (113) grams of paint run-off and provided an overall average particulate removal efficiency of 99.12%. By way of comparison, using the same quick dry enamel formulation, the "waveform" fluid filter 10 allowed twenty-three (23) grams of paint run-off and provided an overall average particulate removal efficiency of 99.58%. For the high-solids permaclad formulation, the "paint pocket" fluid filter allowed one thousand fifty-three (1053) grams of paint run-off and provided an overall average particulate removal efficiency of 99.71%. By way of comparison, using the same high-solids permaclad formulation, the "waveform" fluid filter 10 allowed one hundred seventy (170) grams of paint run-off and provided an overall average particulate removal efficiency of 99.76%.

For the quick dry enamel formulation, the waveform filter 10 was clearly more efficient at removing content from the through-going fluid streams, particularly the particulate from the solvent media. Bearing in mind that a painting operation may provide overspray 100 on the order of roughly 500,000 pounds on an annual basis, the test results suggest that the "waveform" fluid filter 10 is far superior to the "paint pocket" fluid filter in terms of reducing overspray effluent into the atmosphere. In this regard, the test results suggest that the "waveform" fluid filter 10 may well function to prevent 2,300 more pounds of overspray from entering the atmosphere as compared to the "paint pocket" fluid filter at taught by Beier et al. Further, the ratio of "paint pocket" paint run-off mass to "waveform" paint run-off mass was roughly 5, strongly suggesting that "waveform" fluid filter 10 is roughly five times more adept at preventing paint run-off as compared to the "paint pocket" fluid filter.

For the high-solids permaclad formulation, it is noted that the "waveform" fluid filter 10 was modestly more efficient at removing content from the fluid streams, including particulate from the solvent media. However, it should again be noted that the quantities of paint involved in annual painting operations are typically on the order of hundreds of thousands of pounds. Again, given an estimated 500,000 pounds of annual overspray paint usage, the results suggest that the "waveform" fluid filter 10 is superior to the "paint pocket" fluid filter in terms of reducing overspray effluent into the atmosphere. In this regard, the test results suggest that the "waveform" fluid filter 10 may well function to prevent 250 more pounds of overspray from entering the atmosphere as compared to the "paint pocket" fluid filter at taught by Beier et al. Moreover, the ratio of "paint pocket" paint run-off mass to "waveform" paint run-off mass was 6.2, strongly suggesting that "waveform" fluid filter 10 is roughly six times more adept at preventing paint run-off as compared to the "paint pocket" fluid filter.

Not only are the Beier et al. filters less effective at filtering paint overspray, they are relatively more costly to produce. It will be recalled that the Beier et al. "paint pocket" filter is a multi-ply filter wherein the multiple plies are adhesively bonded to one another. The "waveform" fluid filter 10 of the present invention is relatively less costly to manufacture and is more effective at filtering fluid streams as exemplified by paint overspray 100 and as typically defined by quick dry enamels versus high-solids permaclad formulations. Beier et al. further provide a channel-like fluid filter arguably comprising wave-forms in a single dimension, presumably, at least in part, to decrease manufacturing costs associated with the "paint pocket" fluid filter as taught by the '419 and '805 patents. Notably, the channel-like troughs as taught by Beier et al. in U.S. Patent Application Publication No. 2006/0000196 provide linear paint-off channels, which channels provide far inferior means for preventing or retarding paint run-off 23 as well as less effective means for filtering fluid streams.

Figure 14:
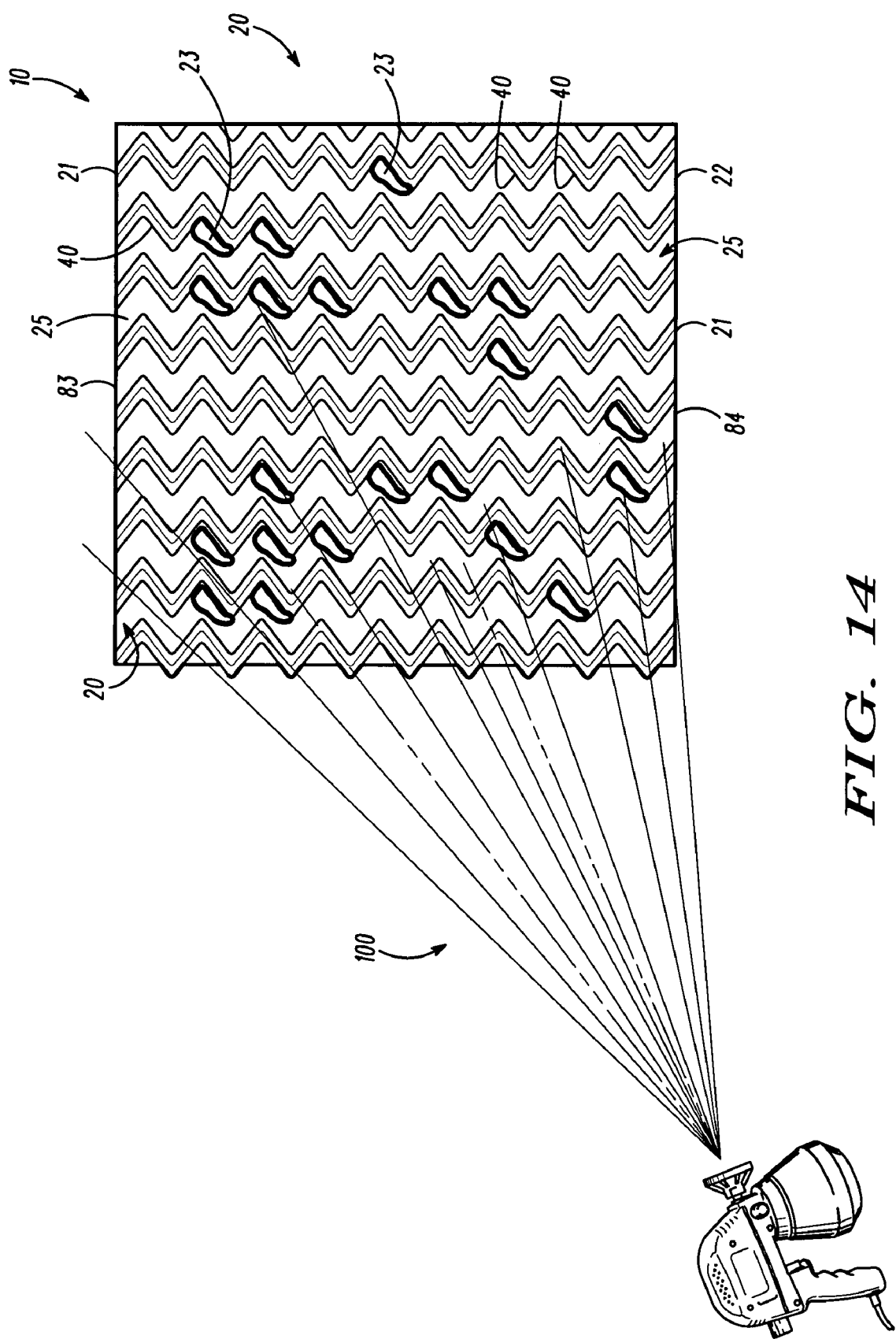
FIG. 14 is a schematic depiction of a paint spray operation providing paint overspray, which overspray is being drawn into a vertically oriented fluid filter according to the present invention.
Figure 15:
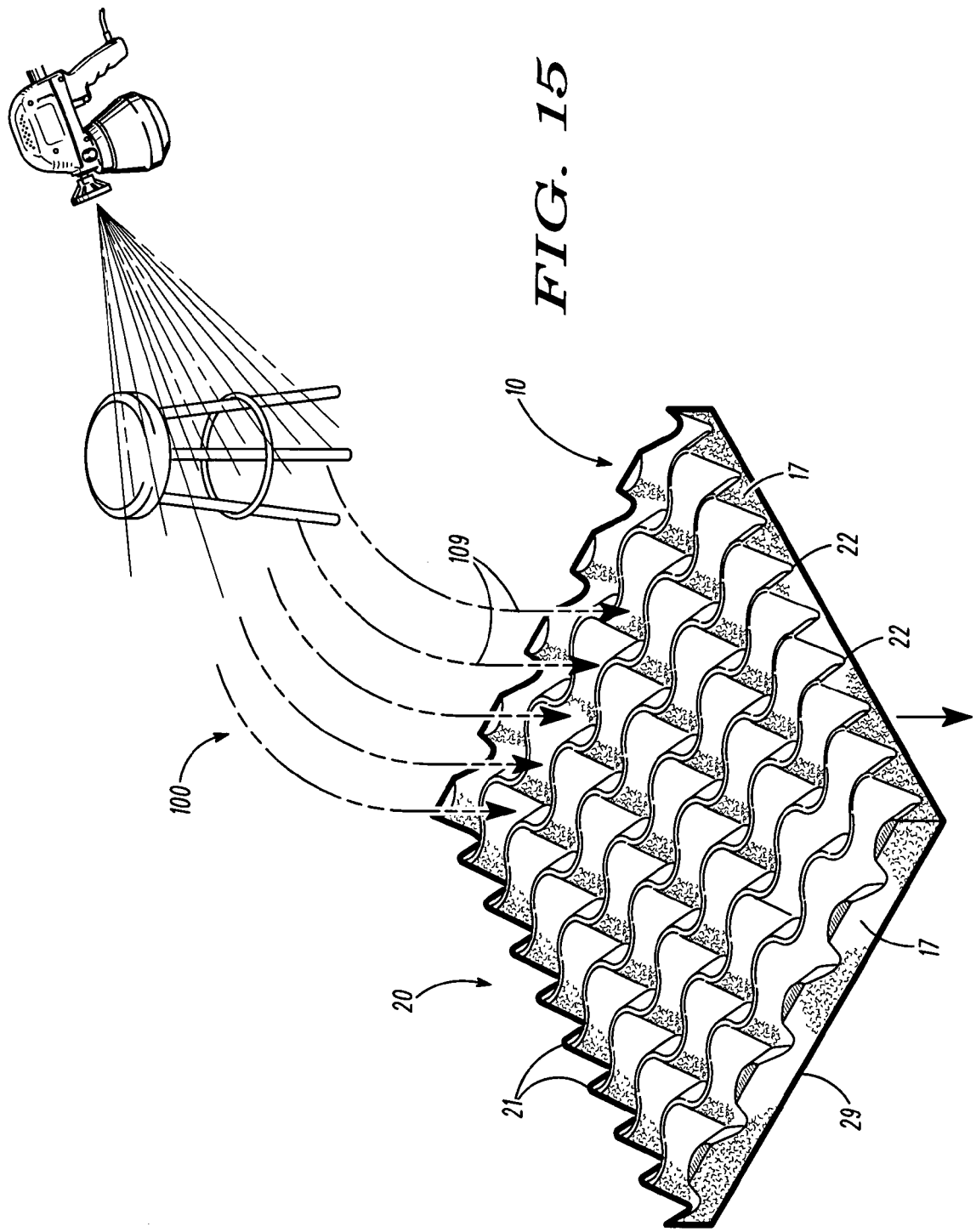
FIG. 15 is a schematic depiction of a paint spray operation providing paint overspray, which overspray is being drawn into a horizontally oriented fluid filter according to the present invention.
Figure 16:
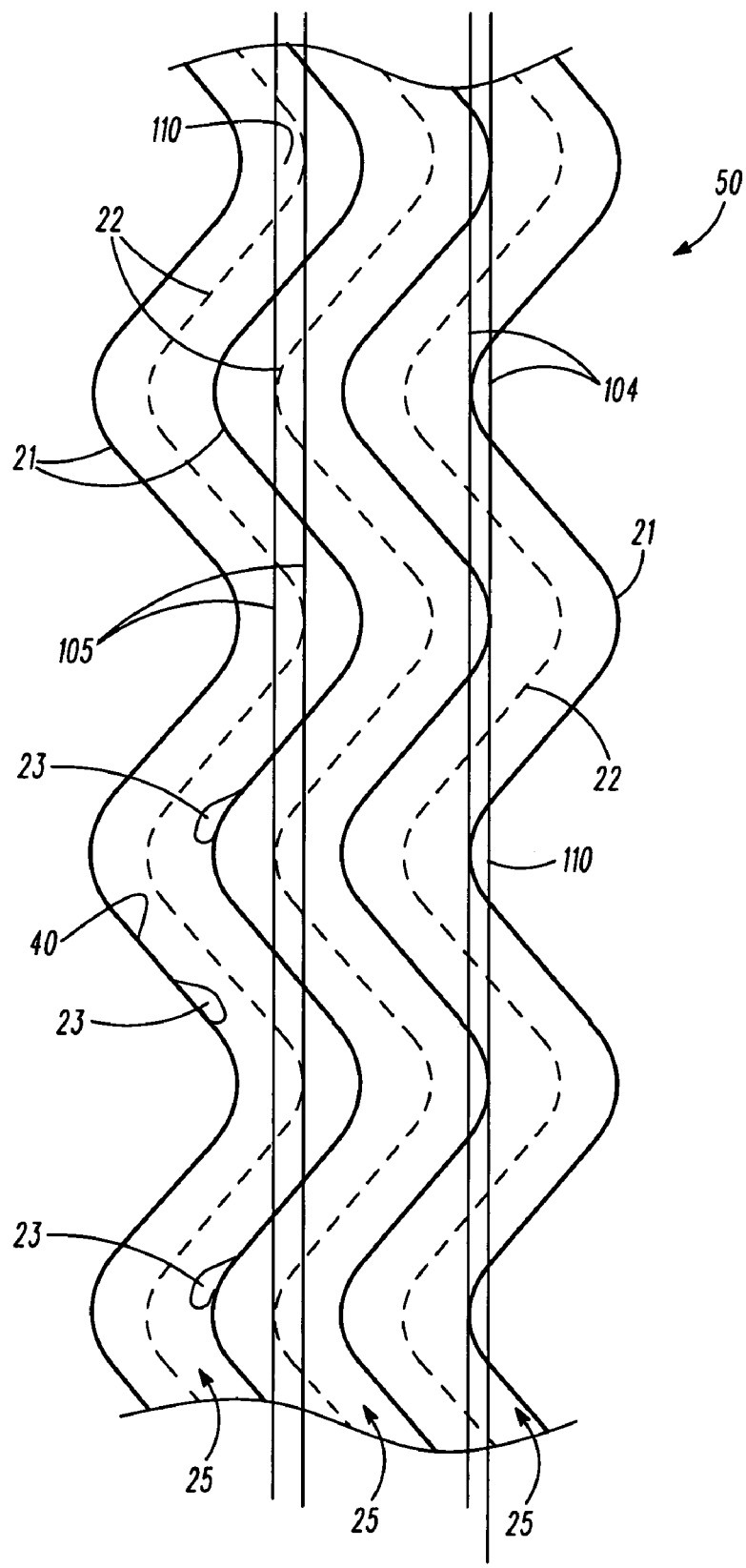
FIG. 16 is a fragmentary enlarged schematic depiction of a triangular waveform showing preferred structure for effecting stepped run-off translation.

The superior results of the "waveform" fluid filter 10 are attributable to the waveform landscape or periodic peak and valley contours formed upon the anterior filter surface 20 as generally depicted and referenced in FIGS. 1-3, 6, and 11-15. By way of contrast, the posterior filter surface 29 or surfacing is typically smooth and substantially planar when in a relaxed, non-flexed state as generally depicted and referenced in FIGS. 4, 5, 6, 9-13, 20, 23, and 25. With regard to the waveform landscape, the same functions to maximize effective air-to-filter surface area for both vertical and horizontal application scenarios as generally depicted in FIGS. 15 and 16 respectively. Further, in the vertical application scenario, the waveforms, when aligned vertically such that the waveform peaks 21 and waveform valleys 22 are aligned in a longitudinal manner, paint run-off 23 is retarded by the undulating peak-valley structure.

In other words, the paint run-off 23 must travel a longer distance to traverse the same displacement in an otherwise linear channel or valley as taught by the Beier et al. Publication as comparatively depicted in FIGS. 16 and 17 versus FIGS. 18(a) and 18(b). This effectively allows the stream directing pressure (as at vector arrow 102 in FIGS. 12, 13, 15, 20, and 23) more time to do work on the collected paint run-off 23 thereby enabling more absorption thereof. From an inspection of FIG. 14, it may be seen that overspray 100 collecting upon the anterior filter surface 20 and forming into paint run-off 23 does not traverse linearly from top to bottom, but in "winding river" or undulating paths 25 as generally depicted and referenced in FIG. 14 and as more specifically depicted and referenced in more detail in FIGS. 16 and 17.

The undulating paint run-off pathways 25 in combination with the increased effective surface area are believed to essentially provide a superior filter as compared to the state of the art. The "paint pockets" 30 of the filters exemplified in the '419 and '805 patents as represented in FIG. 20 collect paint overspray 100 and do not allow paint run-off 23 per se. Rather, paint overspray 100 collects in the pockets 30 and then overspills the pockets 30 as generally depicted in FIG. 19(a) to provide the so-called paint run-off effect or result earlier reported. The paint pocket 30 configuration may thus be said to represent one extreme scenario for retarding paint run-off motion, namely, paint collection 33, which collection 33 is eventually reaches capacity and allows over spillage 34 as generally depicted in FIG. 19(a). Contrasted with the paint pocket structure 30 is the linear paint run-off runway 31 as inherently taught by the trough-like channels 32 of the '196 Publication as generally depicted in FIGS. 18(a) and 18(b). The channels 32 enable unimpeded paint run-off 23 with higher run-off velocities 103 and less time for the air-drawing pressure 102 to do work on the paint collected or paint run-off 23. The "waveform" fluid filter 10 provides improved three-dimensional geometry superior to either the Beier et al. pocket filter of the '419 and '805 patents or the Beier et al. channel filter of the '196 Publication.

It is thus contemplated that the fluid filter 10 according to the present invention may well function to remove matter such as paint particulate or solids from a fluid stream. The fluid filter 10 essentially comprises a three-dimensional anterior filter surface 20. The anterior filter surface 20 comprising parallel waveform contours, including alternating parallel waveform peaks 21 and parallel waveform valleys 22, the latter of which provide "winding river" action or stepped run-off displacements for retarding run-off motion and enabling stream-drawing pressure 102 more time to do work on the traversing run-off 23 for enhancing filter efficiency as generally and comparatively depicted in FIGS. 13, 16, and 17. The parallel waveform contours essentially function to (1) maximize fluid-engaging or fluid-receiving filter surface area; (2) form waveform fluid current(s) 45 as generally depicted in FIGS. 20 and 21; and (3) form undulating fluid pathways 25. The undulating fluid pathways 25 function to dynamically direct or divert fluid collection 33 and run-off 23 upon the anterior filter surface 20.

It is contemplated that the fluid filter 10 may be spatially oriented in either a vertical or horizontal plane. FIG. 14 generally depicts the fluid filter 10 in the preferred vertical orientation for forming longitudinal undulating fluid pathways

25. FIG. 15 generally depicts the fluid filter 10 in a horizontal position in which the maximized filtering surface area is the primary feature, there being negligible, if any, paint run-off when in the horizontal configuration. The undulating fluid pathways 25 may thus be said to define a multi-wavelength longitudinal displacement (multiple wavelengths intermediate a first filter border and a second filter border linearly displaced from the first filter border). From an inspection of FIG. 3, it may be seen that roughly 5 wavelengths extend intermediate the first filter border 81 and the second filter border 82. Similarly, from an inspection of FIG. 14, it may be seen that roughly 9.5 wavelengths extend intermediate the superior or top border 83 and the inferior or bottom border 84. When in a vertical orientation, it is preferred that the periodically-directed waveform peaks 21 and waveform valleys 22 are oriented longitudinally.

Notably, the waveform peaks 21 and valleys 22 are preferably parallel and alternating such that the net result is that the waveforms are periodic or sequential and are preferably single phase or uni-phasal. In this last regard, it should be noted that while a single phase arrangement is perhaps preferred given that the method of manufacture involving uniphasal waveform contours may be the most cost effective waveform pattern. This need not be the case, however. The waveform contours essentially provide run-off retarding, angled or sloped ledges as at 40 in FIGS. 14, 16, and 17. It is contemplated that the waveform contours need not be in phase to effect run-off retarding ledges 40. It is thus further contemplated that sawtooth waveform contours may further operate to effect ledges 40 and thus it is contemplated that sawtooth waveform contours fall within the scope of the teachings being here presented. Further, it will be recalled that the fluid filter 10 may be oriented horizontally thus negating observable run-off effects. In this regard, it is contemplated that any waveform (including square waveform(s)) capable of maximizing the filtering surface area of the anterior filter surface 20 may suffice.

Further, it may be readily understood that the adjacent waveform contours comprise a substantially uniform peak to valley waveform amplitude 41 as depicted and referenced in FIGS. 8, and 11-13. The amplitude 41 essentially functions to define a substantially linear terminal peak axis 104 and a substantially linear terminal valley axis 105 as generally depicted and referenced in FIGS. 16 and 17. It may be seen from an inspection of the noted figures that the terminal peak and valley axes 104 and 105 are preferably parallel to one another and it may be readily understood that when fluid filter 10 is oriented in the vertical orientation, the axes 104 and 105 are parallel to longitudinal axes. In may be further understood that the terminal peak axis 104 of a first waveform is parallel to the terminal peak axis 104 of a second adjacent waveform such that there is an overlap zone as at 110 between the axes 104. Similarly, the terminal valley axis 105 of a first waveform is parallel to the terminal valley axis 105 of a second adjacent waveform such that there is an overlap zone as at 110 between the axes 105. In other words, longitudinally alternating peaks overlap adjacent terminal peak axes 104 so as to provide a stepping mechanism for further retarding run-off 23 as generally depicted in the noted figures.

Figure 17:
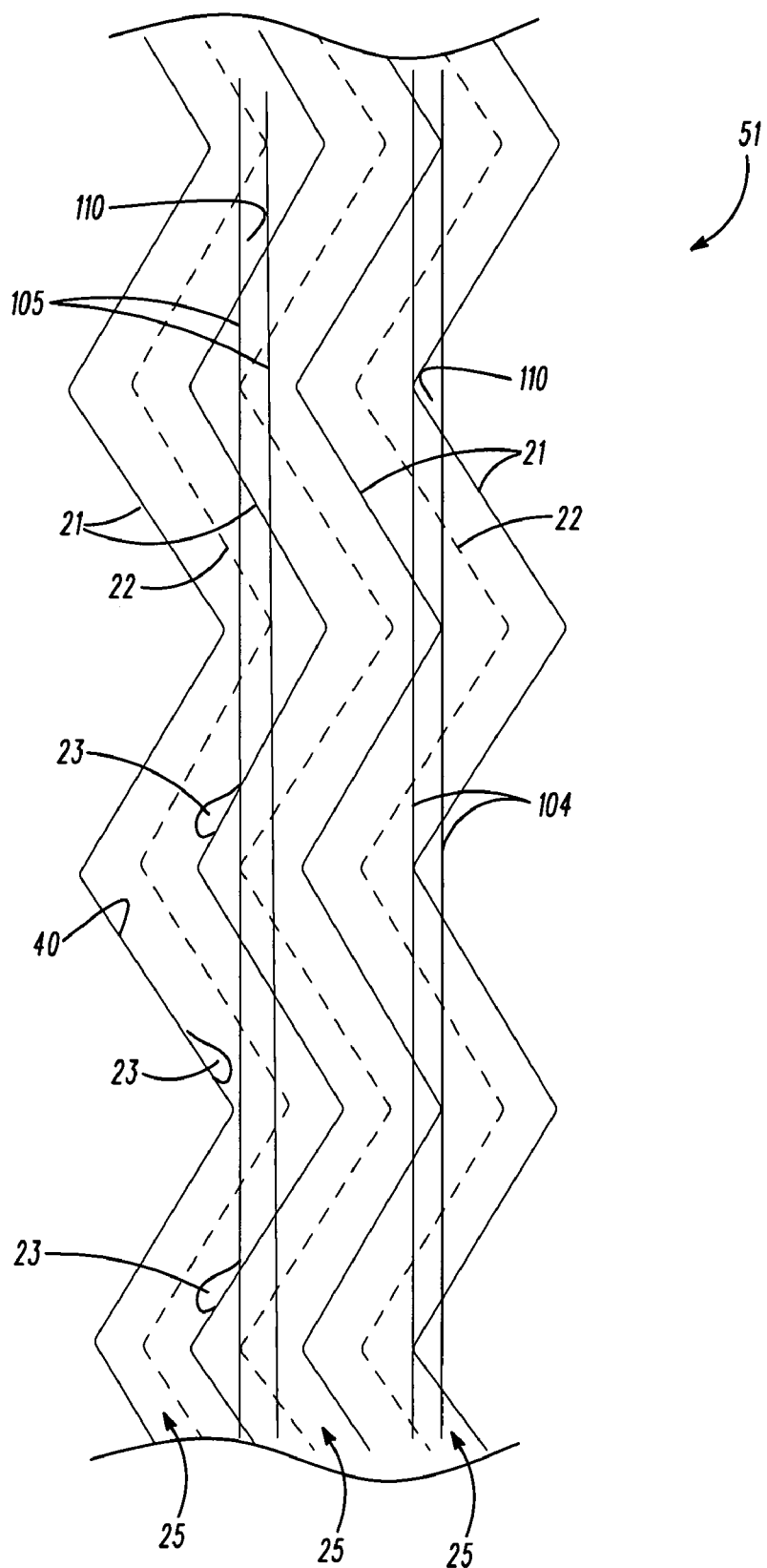
FIG. 17 is a fragmentary enlarged schematic depiction of a sinusoidal waveform showing preferred structure for effecting stepped run-off translation.
Figure 18:
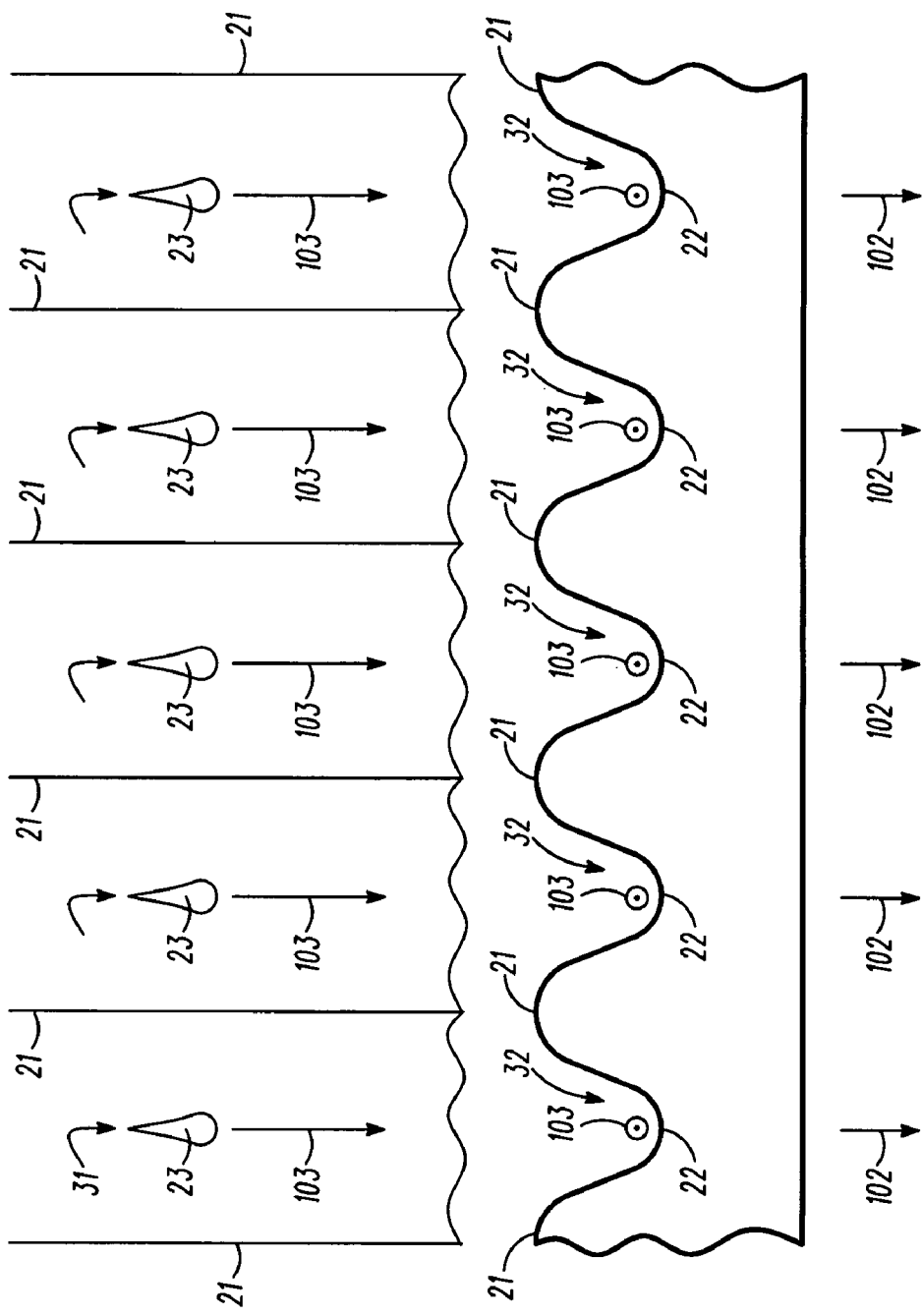
FIG. 18(a) is a fragmentary anterior plan schematic type depiction of a prior art channel filter showing substantially linear run-off pathways.
FIG. 18(b) is a fragmentary sectional end view depiction of the prior art channel filter otherwise shown in FIG. 18(a).
Figure 22:
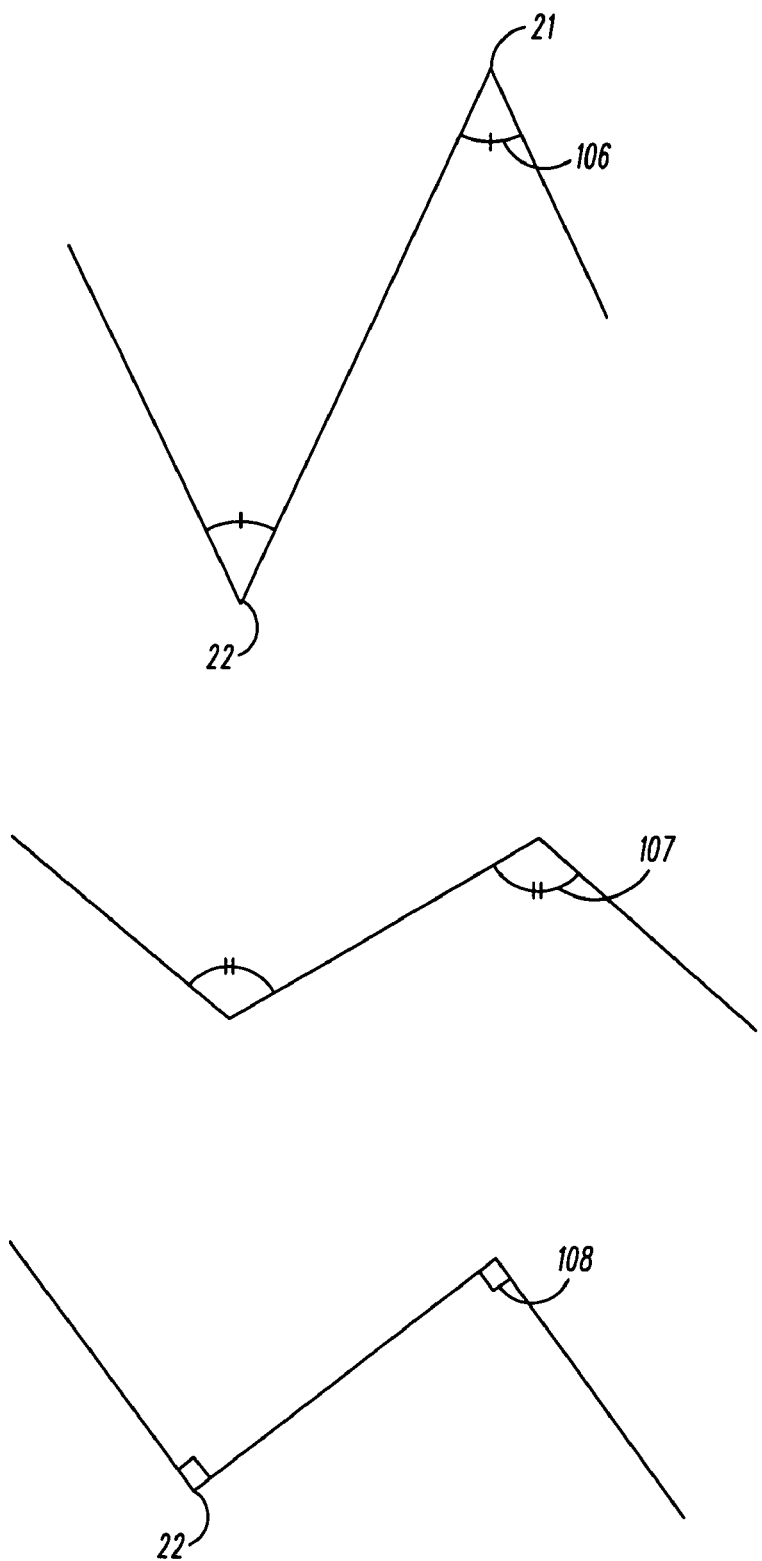
FIG. 22 is a series of three peak and valley angles, the first showing acute peak and valley angles, the second showing obtuse peak and valley angles, and the third showing right peak and valley angles.

It may also be noted from a comparative inspection of FIGS. 16 and 17 that the select waveform contours may be preferably selected from the group comprising sinusoidal waveform contours 50 as generally depicted in FIG. 17 and triangular waveform contours 51 as generally depicted in FIG. 16. Both types of waveforms 50 and 51 provide run-off retarding ledges 40. It is further contemplated that with regard to the triangular waveform contours 50 the same may comprise symmetrically sloped contours (equidistant peak to valley lengths) and non-symmetrically sloped contours (non-equal peak to valley lengths). Further, the waveform peaks 21 and waveform valleys 22 may preferably comprise various angles intermediate peak or valley-defining slopes. Thus, it is contemplated that the waveform peaks 21 preferably comprise or have a substantially uniform select peak angle and the waveform valleys 22 have a substantially uniform select valley angle, wherein the select peak and valley angles are selected from the group consisting of acute angles as at 106, obtuse angles as at 107, and right or ninety (90) degree angles as at 108 in FIG. 22.

While the above description contains much specificity, this specificity should not be construed as limitations on the scope of the invention, but rather as an exemplification of the invention. For example, the foregoing teachings may be said to further support certain fluid filtering methodology. In this regard, it is contemplated that the fluid filtering method according to the present invention may be said to essentially comprise the steps of reducing pressure relatively posterior to a fluid permeable fluid filter 10 for drawing fluid streams toward the fluid filter 10 by way of the reduced pressure as generally depicted at vector arrow 102 (pressure reduction) in FIGS. 12, 13, 15, 18(*b*), and 20; and vector arrow 109 (drawing fluid) in FIGS. 12, 13, 15, and 20. The drawn fluid streams as at 46 may thereafter form into waveform current(s) 45 by way of the waveform contours of the fluid filter 10; and matter otherwise borne by the drawn fluid 46 (such as paint particulate found in overspray 100) may thus be filtered by way of the fluid filter 10.

Figure 23:
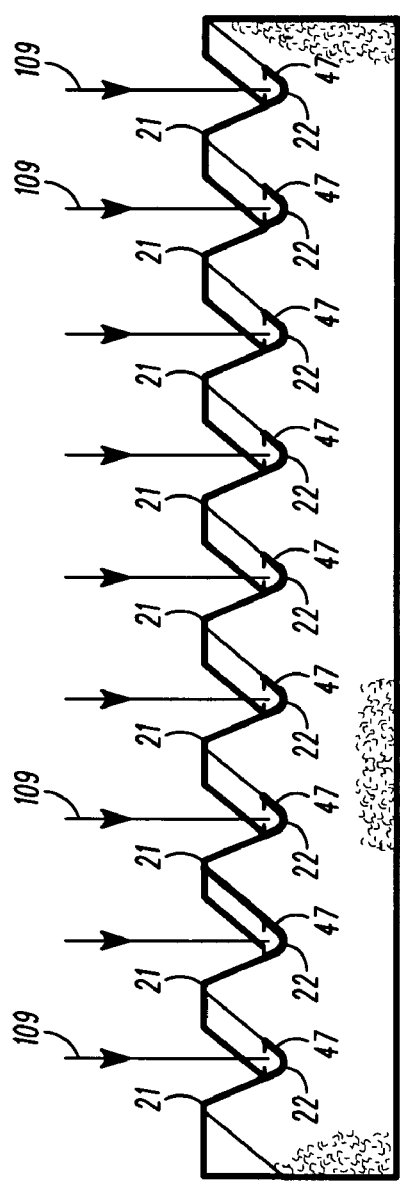
FIG. 23 is a fragmentary end view depiction of the fluid filter according to the present invention showing the waveform landscape directing fluid streams into waveform currents at the anterior filter surface and forming waveform footprints at the valley regions.
Figure 24:
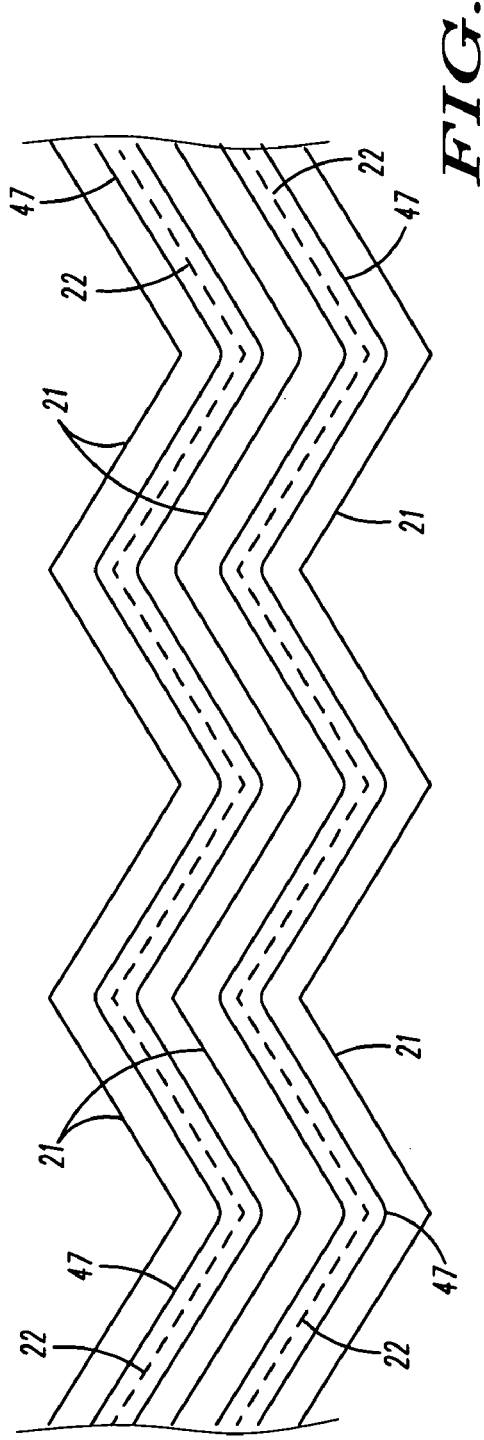
FIG. 24 is a fragmentary anterior plan view of the fluid filter structure otherwise depicted in FIG. 23 showing waveform footprint outlines relative to waveform peaks and waveform valleys.
Figure 25:
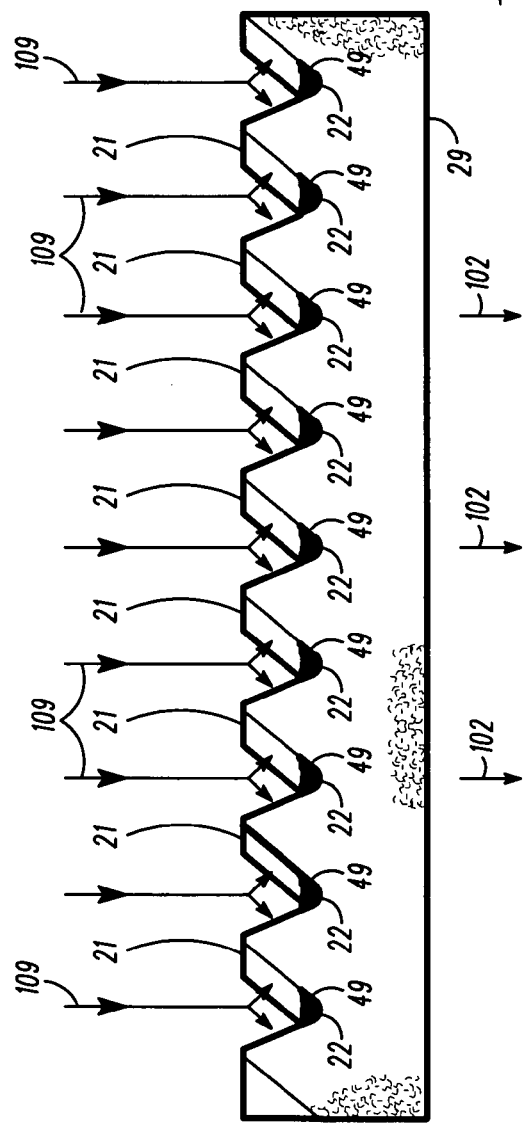
FIG. 25 is a fragmentary end view depiction of the fluid filter according to the present invention showing the waveform landscape directing fluid streams into waveform currents at the anterior filter surface and dividing the waveform currents away from volumetric fluid collections in the valley regions.
Figure 26:
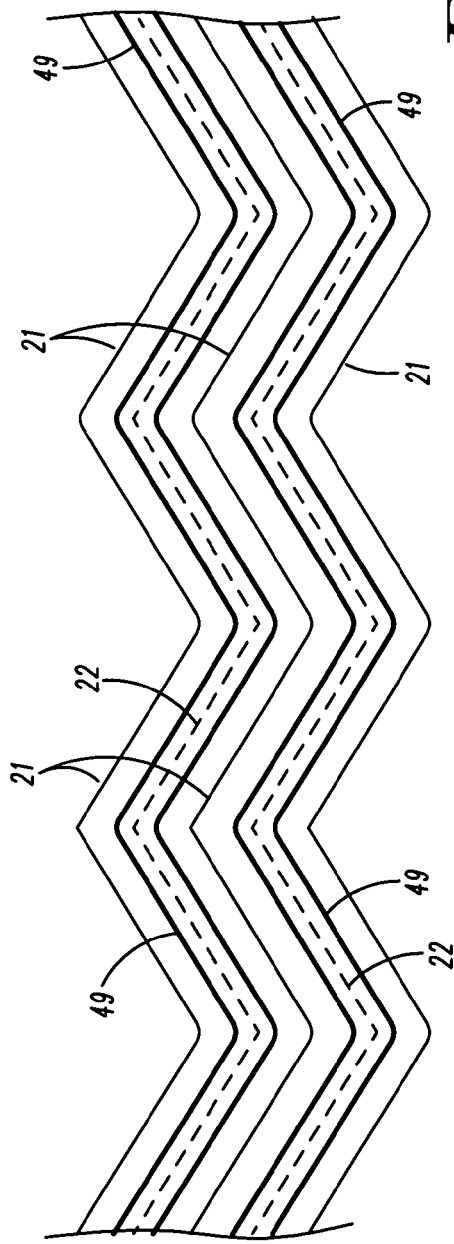
FIG. 26 is a fragmentary anterior plan view of the fluid filter structure otherwise depicted in FIG. 25 showing fluid collection outlines relative to waveform peaks and waveform valleys.

The filtered matter may thus form waveform footprint 47 (substantially planar areas of accumulated matter) as generally depicted and referenced in FIGS. 23 and 24. Over time, the formation of the waveform footprint 47 collects additional matter, and thus forms volumetric fluid quantities. When the waveform footprint 47 begins to collect fluid, the waveform current(s) 45 are further divided by way of the collected fluid 49 as generally depicted and referenced in FIGS. 25 and 26 as the fluid path through the fluid filter 10 follows the path of least resistance around the collected fluid 49. The method contemplated by the present invention may thus be said to further comprise the step of collecting fluid as at 49 in FIGS. 25 and 26 by way of the waveform footprint 47.

It will be recalled that the preferred method for directing or diverting run-off 23 according to the principles of the present invention is to provide a winding river or undulating pathway 25 (with overlapping adjacent peaks) so that the collected fluid 49 may be step-directed or tread-directed as it begins to traverse the winding/undulating pathways 25. The run-off 23 or tread-directed (i.e. directed by way of the footprint) fluid collection 49 may well function to wipe the waveform footprint 47 noting that collected fluids comprise a certain inherent surface tension or "stickiness" that functions to pull portions of the collected fluid 49 by way of certain capillary action. This physical principle functions in concert with the geometry provided by the fluid filter 10 to wipe the waveform footprint 47, which wiped waveform footprint 47 dynamically modifies or alters the divided waveform current(s) 45 for enhancing the overall effectiveness of the fluid filter 10.

Figures 27, 28:
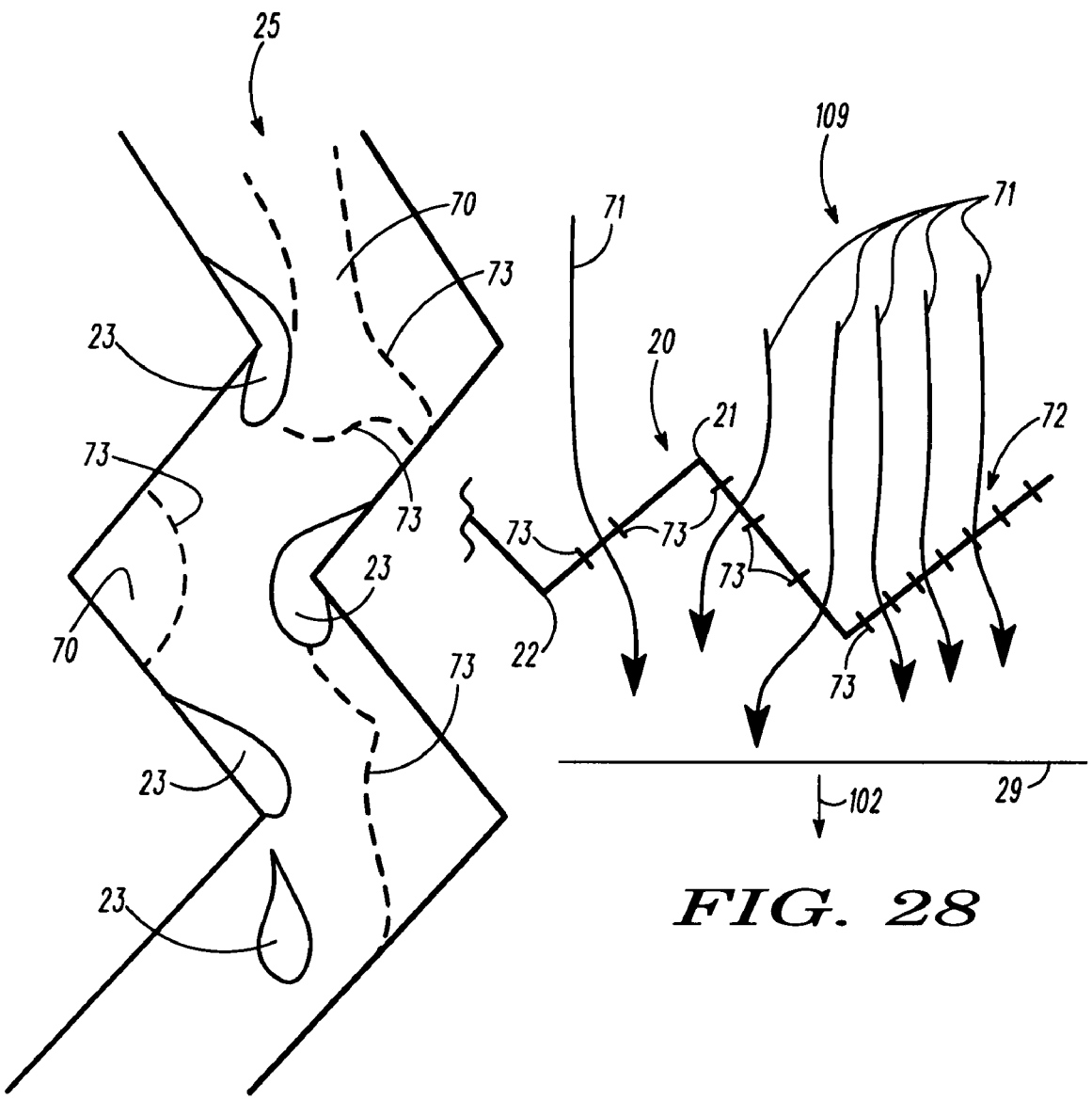
FIG. 27 is an enlarged fragmentary anterior plan depiction of a single undulating fluid pathway according to the present invention showing run-off wiping portions of waveform footprints from the pathway and forming areas of reduced resistance as bounded by broken lines.
FIG. 28 is a fragmentary cross-sectional view of the pathway otherwise depicted in FIG. 27 depicting dynamically changing gated areas of reduced resistance for dynamically directing fluid streams through the fluid filter for enhancing the effectiveness thereof.

In other words, it is contemplated that when run-off 23 occurs, the run-off 23 essentially wipes portions of the pathways 25, and certain areas or reduced resistance form. The areas are referenced at 70 and bound by borders as depicted by broken lines 73 in FIG. 27, and are further depicted by slope-traversing lines 73 in FIG. 28. The areas 70 periodically become less resistive via the wiping action thereby redirecting drawn fluid 109 in dynamically changing streams 71, which streams 71 enter areas 70 or reduced resistance as symbolized by gates 72 in FIG. 28. The gates 72 may continually change in number, size, and shape, and thus it is contemplated that the fluid filter 10 may well function to dynamically modify the divided waveform current(s) 45 by way of the wiped waveform footprint(s) 47.

In other words, it is noted that the fluid filter 10 of the present invention eventually becomes saturated with filtered media and the like. However, as the fluid filter 10 progresses to saturation or maximum capacity, localized fluctuations in gated area 70 resistance occur due to footprint 47 formation, fluid collection 49, and run-off 23 wiping activity. If fluid stream flux through a given section of filtering surface area were to be plotted as a function of time, it is conceivable that the resulting plot might appear similar to a plot of damped oscillatory motion. In other words, it is contemplated that the flux density periodically decreases and increases due to changes in resistance caused by wiping action (removal of material) and filtering action (addition of material). Over time, as matter continually accumulates upon the anterior filter surface 20, the overall flux tends to zero.

The fluid filter 10 of the present invention is thus believed to essentially function to remove matter from a fluid stream and to achieve this function, essentially comprises a three-dimensional anterior filter surface, which surface comprises parallel (i.e. separated) waveform contours for (1) maximizing fluid-engaging filter surface area, (2) forming waveform fluid current, and (3) forming undulating fluid pathways. The undulating fluid pathways may well function to dynamically direct fluid collection and retard fluid un-off from the anterior filter surface for enhancing the effectiveness of the fluid filter 10. Stated another way, the fluid filter 10 of the present invention may be said to comprise a fluid-receiving filter surface having a three-dimensional waveform landscape with alternating waveform peaks and waveform valleys, which waveform peaks and valleys simultaneously extend in at least two dimensions. The waveform landscape thus maximizes fluid-engaging filter surface area, forms waveform fluid current(s), and forms winding fluid pathways for dynamically directing fluid collection.

Accordingly, although the invention has been described by reference to certain preferred embodiments, and certain filtering methodology, it is not intended that the novel fluid filter and/or filtering method supported by the fluid filter be limited thereby, but that modifications thereof are intended to be included as falling within the broad scope and spirit of the following claims and the appended drawings.

I claim:

1. A method for filtering a fluid stream, the method comprising the steps of:

reducing pressure relatively posterior to a fluid permeable fluid filter;

drawing fluid toward the fluid filter by way of the reduced pressure;

forming the drawn fluid into waveform current by way of the fluid filter;

filtering matter borne by the drawn fluid by way of the fluid filter, and forming a waveform footprint by way of the filtered matter deposited on the fluid filter.

2. The method of claim 1 comprising the step of dividing the waveform current by way of the waveform footprint.

3. The method of claim 2 comprising the step of collecting fluid by way of the waveform footprint.

4. The method of claim 3 comprising the step of step-directing the collected fluid by way of the fluid filter.

5. The method of claim 3 comprising the step of tread-directing the collected fluid by way of the fluid filter.

6. The method of claim 5 comprising the step of wiping the waveform footprint by way of the tread-directed fluid.

7. The method of claim 6 comprising the step of dynamically modifying the divided waveform current by way of the wiped waveform footprint.

8. A method for filtering a fluid stream, the method comprising the steps of:

directing a fluid stream into a fluid-permeable fluid filter having a three-dimensional waveform landscape;

forming the directed fluid into waveform current by way of the waveform landscape;

filtering matter borne by the directed fluid by way of the waveform landscape; and forming a waveform footprint by way of the filtered matter deposited on the fluid filter.

9. The method of claim 8 comprising the step of dividing the waveform current by way of the waveform footprint.

10. The method of claim 9 comprising the step of collecting fluid by way of the waveform footprint.

11. The method of claim 10 comprising the step of step-directing the collected fluid by way of the waveform landscape.

12. The method of claim 10 comprising the step of tread-directing the collected fluid by way of the waveform landscape.

13. The method of claim 12 comprising the step of wiping the waveform footprint by way of the tread-directed fluid.

14. The method of claim 13 comprising the step of dynamically modifying the divided waveform current by way of the wiped waveform footprint.

* * * * *